(12) United States Patent
Chetlur Ravi et al.

(10) Patent No.: US 12,136,992 B2
(45) Date of Patent: Nov. 5, 2024

(54) MANAGING UNMANNED AERIAL VEHICLE BROADCAST SIGNALS

(71) Applicant: QUALCOMM Incorporated, San Diego, CA (US)

(72) Inventors: Vishnu Vardhan Chetlur Ravi, San Diego, CA (US); Alberto Rico Alvarino, San Diego, CA (US); Le Liu, Fremont, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/467,235

(22) Filed: Sep. 5, 2021

(65) Prior Publication Data
US 2023/0074011 A1    Mar. 9, 2023

(51) Int. Cl.
*H04B 7/185*    (2006.01)
*H04W 16/28*    (2009.01)

(52) U.S. Cl.
CPC ........ *H04B 7/18506* (2013.01); *H04W 16/28* (2013.01)

(58) Field of Classification Search
CPC .......................... H04B 7/18506; H04W 16/28
See application file for complete search history.

(56) References Cited

U.S. PATENT DOCUMENTS 9,918,235 B2    3/2018  Brennan et al.
2013/0258885 A1*  10/2013  Yu ........................ H04B 7/0695
                                                    370/252
2017/0150373 A1*  5/2017  Brennan ................. H04W 4/40
2018/0288713 A1*  10/2018  Kosseifi ............ H04W 52/0212
2019/0081688 A1*  3/2019  Deenoo ................... H04L 5/005
2019/0139422 A1*  5/2019  Cheah ................ G01C 21/1654
2019/0166516 A1*  5/2019  Kim ....................... H04W 36/30
2019/0173201 A1    6/2019  Chen
(Continued)

FOREIGN PATENT DOCUMENTS

WO    2019030280 A1    2/2019
WO    2020023656 A1    1/2020

OTHER PUBLICATIONS

Partial International Search Report—PCT/US2022/039375—ISA/EPO—Nov. 18, 2022.
(Continued)

*Primary Examiner* — Tejis Daya
(74) *Attorney, Agent, or Firm* — The Marbury Law Group/QUALCOMM Incorporated

(57) ABSTRACT

Aspects include systems, methods, devices, and non-transitory processor readable storage mediums for managing a broadcast signal of an apparatus for wireless communication. Various aspects may enable an apparatus to send a message using either omnidirectional transmissions or beamformed transmission based on whether the altitude of the apparatus meets an altitude threshold. In some implementations and aspects, the processor of the apparatus may determine a type of the message and may select the altitude threshold based on the determined message type. In some implementations and aspects, the processor of the apparatus may send the message using beamformed transmissions in response to determining that the message is intended for reception by a certain type of second apparatus.

31 Claims, 15 Drawing Sheets

(56) References Cited

U.S. PATENT DOCUMENTS

| | | | | |
|---|---|---|---|---|
| 2019/0254105 A1* | 8/2019 | Kim | ...................... | H04W 76/27 |
| 2020/0037219 A1* | 1/2020 | Kumar | .................. | H04W 36/30 |
| 2020/0245174 A1* | 7/2020 | Lu | ......................... | H04W 24/10 |
| 2020/0252941 A1* | 8/2020 | Schmidt | ................ | H04W 36/16 |
| 2020/0359377 A1* | 11/2020 | Mochizuki | ............ | H04W 16/32 |
| 2020/0396718 A1* | 12/2020 | Luo | ........................... | H04L 5/16 |
| 2021/0044457 A1* | 2/2021 | He | ......................... | H04B 7/086 |

OTHER PUBLICATIONS

International Search Report and Written Opinion—PCT/US2022/039375—ISA/EPO—Jan. 10, 2023 19 pages.
3GPP: "3rd Generation Partnership Project, Technical Specification Group Radio Access Network, Study on Enhanced LTE Support for Aerial Vehicles (Release 15)", 3GPP TR 36.777 V0.0.1, May 2017, pp. 1-8.
Federal Communications Commission: "Report on Section 374 of the FAA Reauthorization Act of 2018", Wireless Telecommunications Bureau Office of Engineering and Technology, Aug. 20, 2020, 13 pages.

\* cited by examiner

MANAGING UNMANNED AERIAL VEHICLE BROADCAST SIGNALS

INTRODUCTION

The following relates generally to wireless communications, and more specifically to managing wireless communications of an apparatus based at least in part on the altitude of the apparatus.

Apparatuses configured for wireless communication, for example, unmanned aerial vehicles (UAV), may transmit various messages to support a variety of functions. Different messages may be subject to different requirements for communications, such as range and latency. There exists a need for further improvements in wireless communication by such apparatuses.

SUMMARY

This summary is a simplified summation of one or more aspects presented to provide a basic understanding of such aspects. This summary is not an extensive overview of all aspects contemplated, is not intended to identify key or critical elements of all aspects, and is not meant to delineate the scope of any or all aspects. This summary's sole purpose is to present some aspects in a simplified form as a prelude to the more detailed description that is presented later.

Various aspects may include a method performed for managing a broadcast signal. The method may include obtaining an altitude of the apparatus, and sending a message using beamformed transmissions in response to the altitude of the apparatus meeting an altitude threshold.

Another apparatus for wireless communication is described. The apparatus may include a memory and a processor, the memory and the processor configured to obtain an altitude of the apparatus, and send a message using beamformed transmissions in response to the altitude of the apparatus meeting an altitude threshold.

Some examples of the method, apparatuses, and non-transitory processor readable storage medium described herein may include operations, features, means, or instructions for sending the message using omnidirectional transmissions in response to the altitude of the apparatus failing to meet the altitude threshold.

Some examples of the method, apparatuses, and non-transitory processor readable storage medium described herein may include obtaining the altitude of the apparatus from one or more of an altitude sensor, apparatus barometer information, a global navigation satellite system receiver, or a network element that provides the altitude of the apparatus.

Some examples of the method, apparatuses, and non-transitory processor readable storage medium described herein may include determining a type of the message, and selecting the altitude threshold based on the determined type of the message.

Some examples of the method, apparatuses, and non-transitory processor readable storage medium described herein may include sending the message using omnidirectional transmissions in response to the message being for reception by a first type of second apparatus, and sending the message using beamformed transmissions in response to the message being for reception by the second type of second apparatus.

In some examples of the method, apparatuses, and non-transitory processor readable storage medium described herein, sending the message using beamformed transmissions in response to the message being for reception by the second type of second apparatus may include sending the message using beamformed transmissions in response to the message being for reception by the second type of second apparatus and the altitude meeting the altitude threshold.

In some examples of the method, apparatuses, and non-transitory processor readable storage medium described herein the message for reception by the first type of second apparatus may include a maneuvering safety message and the message for reception by the second type of second apparatus may include an identification message.

Some examples of the method, apparatuses, and non-transitory processor readable storage medium described herein may include sending the message using beamformed transmissions in directional beams in at least two different directions.

Some examples of the method, apparatuses, and non-transitory processor readable storage medium described herein may include sending the message using beamformed transmissions in directional beams in at least two different directions within a latency constraint of the message.

Some examples of the method, apparatuses, and non-transitory processor readable storage medium described herein may include sending the message using beamformed transmissions in directional beams in at least two different directions via a sidelink communication link.

Some examples of the method, apparatuses, and non-transitory processor readable storage medium described herein may include including in beamformed transmissions a beam identifier that enables a receiver device to obtain the beam identifier of a directional beam used to transmit a received beamformed transmission.

Some examples of the method, apparatuses, and non-transitory processor readable storage medium described herein may include receiving from a second apparatus a retransmission request including the beam identifier of the received beamformed transmission, and retransmitting the message using beamformed transmissions associated with the beam identifier.

Some examples of the method, apparatuses, and non-transitory processor readable storage medium described herein may include receiving from a second apparatus a retransmission request, and retransmitting the message using omnidirectional transmissions when the altitude of the apparatus fails to meet the altitude threshold.

Some examples of the method, apparatuses, and non-transitory processor readable storage medium described herein may include retransmitting the message using beamformed transmissions when the altitude of the apparatus meets the altitude threshold.

An apparatus is described. The apparatus may include memory, and a processor, the memory and the processor configured to receive beamformed transmissions from a second apparatus, obtain a beam identifier of a directional beam of beamformed transmissions in response to unsuccessfully decoding the message, and transmit to the second apparatus a retransmission request in beamformed transmissions using the obtained beam identifier.

A method for managing a broadcast signal is described. The method may include obtaining an altitude of the apparatus, and sending a message using beamformed transmissions in response to the altitude of the apparatus meeting an altitude threshold.

BRIEF DESCRIPTION OF THE DRAWINGS

The accompanying drawings, which are incorporated herein and constitute part of this specification, illustrate exemplary implementations and aspects of the claims, and together with the general description given above and the detailed description given below, serve to explain the features of the claims.

DETAILED DESCRIPTION

Figure 1A:
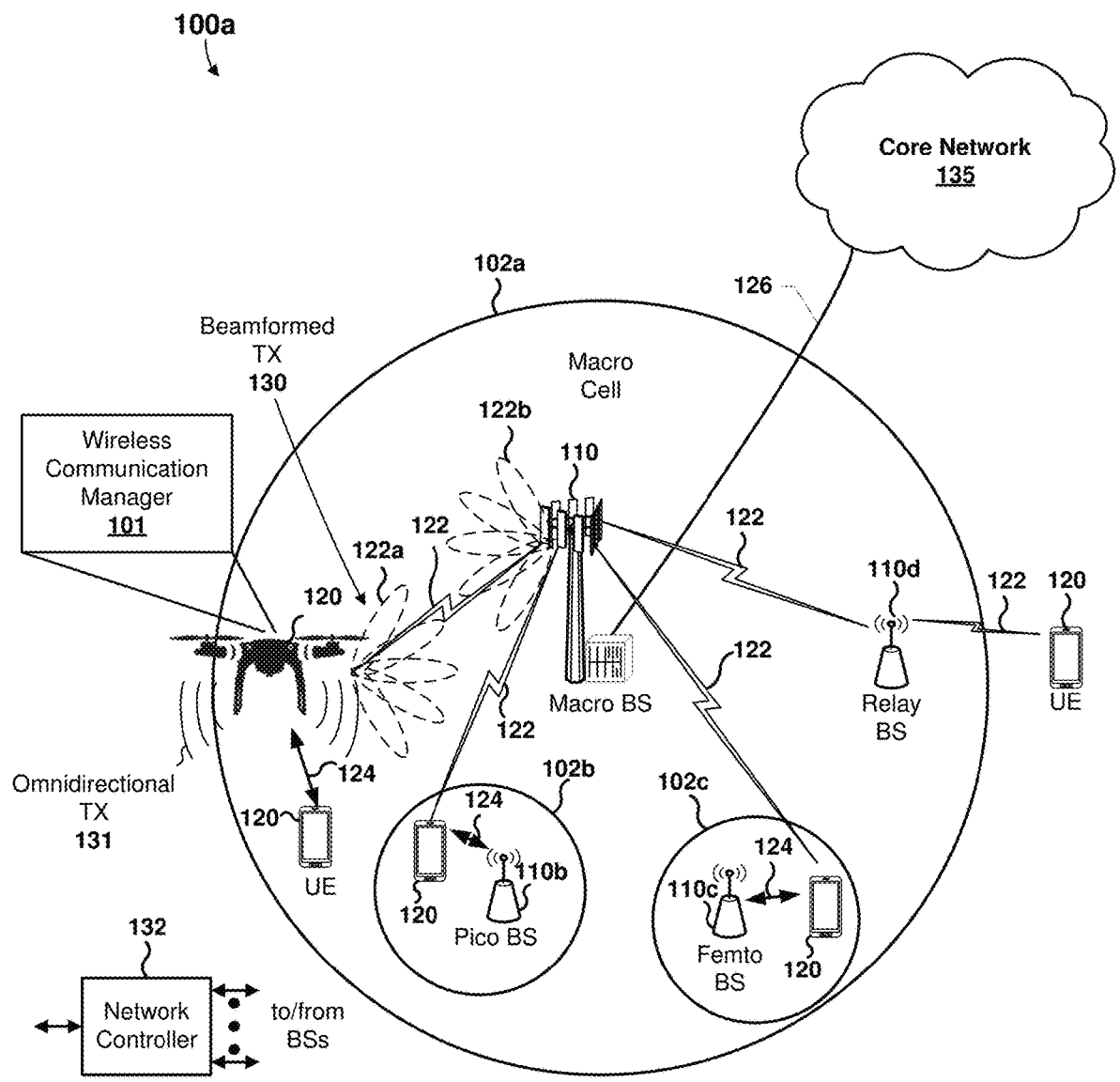
FIG. 1A is a system block diagram illustrating an example communication system suitable for implementing any of the various aspects.

Apparatuses configured for wireless communication, for example, unmanned aerial vehicles (UAVs), may transmit various messages to support a variety of functions. For example, an apparatus may broadcast a "maneuvering safety message," such as a Detect and Avoid message (e.g., UAV-to-Everything Detect and Avoid (U2X-DAA)) to enable other apparatuses (e.g., other UAVs) to detect and avoid collisions. As another example, an apparatus may broadcast identification and location information, for example, for use by law enforcement or other official agencies. Other examples of wireless communications to or from another apparatus (e.g., a UAV) include data messages such as camera or other sensor information, maneuvering messages such as swarm behavior messages, and other suitable apparatus-to-apparatus communications. One example of wireless communications to or a from another apparatus (e.g., a ground receiver) is a message including identity information and/or location information of the apparatus (referred to herein as an "identification message"), which may be used by automated or semi-automated air traffic control systems, governmental agencies such as law enforcement, and the like. An example of an identification message is a U2X-ID message.

In some situations, different types of messages may be subject to varying parameters regarding their transmissions. For example, certain maneuvering safety messages by regulation should be transmitted to terrestrial devices of law enforcement or other official agencies. As another example, a maneuvering safety message and an identification message may be subject to different latency requirements by regulation. For instance, a maneuvering safety message may be required by regulation to be transmitted more frequently than an identification message. As another example, a longer transmission range may be required by regulation of an identification message (which may be required for ground receiving apparatuses) than a transmission range for a maneuvering safety message. As another example, maneuvering safety messages may be required by regulation to be transmitted more frequently than identification messages.

Various aspects include systems methods, devices, and non-transitory processor readable storage mediums for managing broadcast signals transmitted by an apparatus. In various aspects, based on whether an altitude of an apparatus meets an altitude threshold, the apparatus may transmit (or configure a message for transmission by the apparatus) as either omnidirectional transmissions or as beamformed transmissions. In some aspects, based on a type of message to be transmitted and whether an altitude of an apparatus meets an altitude threshold, the apparatus may transmit (or configure a message for transmission by the apparatus) as either omnidirectional transmissions or as beamformed transmissions. In some aspects, the apparatus may transmit beamformed transmissions in a plurality of directions from the apparatus, such as in four quadrants, or in a plurality of directions from the apparatus in response to the altitude of the apparatus meeting the altitude threshold.

Wireless communications between apparatuses (e.g., UAVs) that operate at varying altitudes and/or distances from other apparatuses (e.g., other UAVs, ground stations, controllers, and the like) may experience various effects due to separation distances. For example, UAVs operating at high altitude may experience signal attenuation in omnidirectional wireless transmissions with ground stations. For battery-powered apparatuses (e.g., UAVs), increasing transmit power to overcome distance-related attenuation may be impractical. Communicating using beam-formed transmissions may increase gain along the beam axis, and thus extend the range at which such transmissions may be received. However, the use of beamforming in communications may not be suitable in all operating situations. Various implementations and aspects address these communication tradeoffs by selecting beamforming or omnidirectional transmission methods for apparatus communications based on altitude and/or type of communication. Selecting between omnidirectional and beamforming transmission techniques based on altitude and/or communication type may improve the communication performance of apparatuses (e.g., UAVs) while conserving power.

While the description refers at times to a UAV, it will be understood that a UAV is merely one type of apparatus according to various implementations and aspects. Further, a UAV may include one of various types of vehicles including an onboard computing device configured to provide some autonomous or semi-autonomous capabilities. Examples of such vehicles include but are not limited to: aerial vehicles, such as UAVs; ground vehicles (e.g., an autonomous or semi-autonomous car, a vacuum robot, etc.); water-based vehicles (i.e., vehicles configured for operation on the surface of the water or under water); and/or some combination thereof. In some implementations and aspects, the vehicle may be manned. In other implementations and aspects, the vehicle may be unmanned. In implementations and aspects in which the vehicle is autonomous, the vehicle may include an onboard computing device configured to maneuver and/or navigate the vehicle without remote operating instructions (i.e., autonomously), such as from a human operator (e.g., via a remote computing device). In implementations and aspects in which the vehicle is semi-autonomous, the vehicle may include an onboard computing device configured to receive some information or instructions, such as from a human operator (e.g., via a remote computing device), and autonomously maneuver and/or navigate the vehicle consistent with the received information or instructions. In some implementations and aspects, the vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the vehicle. Non-limiting examples of rotorcraft include tricopters (three rotors), quadcopters (four rotors), hexacopters (six rotors), and octocopters (eight rotors). However, a rotorcraft may include any number of rotors. A vehicle may include a variety of components and/or payloads that may perform a variety of functions. The term "components" when used with respect to a vehicle includes vehicle components and/or vehicle payloads.

Various aspects will be described in detail with reference to the accompanying drawings. Wherever possible, the same reference numbers will be used throughout the drawings to refer to the same or like parts. References made to particular examples and implementations and aspects are for illustrative purposes, and are not intended to limit the scope of the claims.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3 G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

As used herein, "beam" refers to a signal formed at a transmitting device through the use of a beamforming or beam steering technique applied via a combination of physical equipment and signal processing variously referred to as a beamforming function, a mapping function, or a spatial filter. Beam reception by a receiving device may involve configuring physical equipment and signal processing of the receiving device to receive signals transmitted in a beam by the transmitting device. In some situations, beam reception by a receiving device also may involve configuring physical equipment and signal processing of the receiving device via a beamforming function, a mapping function, or a spatial filter so as to preferentially receive signals (e.g., with enhanced gain) from a particular direction (e.g., in a direction aligned with a transmitting device).

The term "beamforming" is used herein to refer to antenna array design and signal processing techniques used for directional signal communications and/or to achieve spatial selectivity of radio frequency (RF) signal reception. Beamforming on the transmitter end of communications may be accomplished by selective delaying (known as "phase shifting") of signals coupled to different elements in an antenna array so that RF signals emitted by the antenna array at a particular angle (relative to the antenna array) are enhanced through constructive interference while RF signals emitted by the antenna array at other angles (relative to the antenna) exhibit lower signal strength due to destructive interference. Beamforming on the receiver end of communications may be accomplished by processing signals received by elements in an antenna array through phase shifting circuits so that RF signals received at particular angles relative to the receiving antenna array are enhanced through constructive interference while RF signals received at other angles relative to the wireless device are reduced in perceived signal strength through destructive interference. Using beamforming techniques, RF signals may be transmitted (e.g., by a base station or wireless device) in one or more directional "beams" within the millimeter band for ultra-wideband communications. Each of such directional beams may be controlled by the transmitter using beamforming techniques to sweep in one or two dimensions (i e, azimuth and elevation directions). Beamforming in both transmitters and receivers may be accomplished using analog (e.g., phase shifter) circuits and digital processing techniques. To encompass both techniques, reference is sometimes made herein to "analog/RF beamforming" techniques and equipment.

FIG. 1A is a system block diagram illustrating an example communication system 100a suitable for implementing any of the various aspects or implementations. The communications system 100aa may be a 5G New Radio (NR) network, or any other suitable network such as an LTE network, 5G network, etc. While FIG. 1A illustrates a 5G network, later generation networks may include the same or similar elements. Therefore, the reference to a 5G network and 5G network elements in the following descriptions is for illustrative purposes and is not intended to be limiting.

The communications system 100a may include a heterogeneous network architecture that includes a core network 135 and a variety of wireless devices (illustrated as UEs 120 in FIG. 1A). In various implementations and aspects, the wireless devices 120 may include apparatuses such as UAVs. The communications system 100a may also include a number of base stations (illustrated as the BS 110, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 135 may be any type core network, such as an LTE core network (e.g., an Evolved Packet Core (EPC) network), 5G core network, etc.

A base station 110-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110 may be a macro BS for a macro cell 102a, a base station 110b may be a pico BS for a pico cell 102b, and a base station 110c may be a femto BS for a femto cell 102c. A base station 110 110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110-110d may be interconnected to one another as well as to one or more other base stations or network nodes (not illustrated) in the communications system 100a through various types of backhaul interfaces, such as a direct physical connection, a virtual network, or a combination thereof using any suitable transport network The base station 110-110d may communicate with the core network 135 over a wired or wireless communication link 126. The wireless devices 120 may communicate with the base station 110-110d over a wireless communication link 122. In some implementations and aspects, the base station 110 may be a non-mmW cell (e.g., LTE cell, Sub-6 GHz cell, etc.). In some implementations and aspects, the base station 110 may be a mmW cell (e.g., a gNB operating at mmW frequencies). In scenarios in which the base station 110 is a mmW cell, the base station 110 may utilize beamforming for communications with the wireless device 120. In a similar manner, the wireless device 120 (e.g., an apparatus such as a UAV) may utilize beamforming for communications with the base station 110. The base station 110 may transmit a beamformed signal, such as a mmW beam, in one or more transmit directions 122b. The wireless device 120 may receive the beamformed signal from the base station 110 in one or more receive directions 122a. The wireless device 120 may transmit a beamformed signal, such as a mmW beam, in one or more transmit directions. The base station 110 may receive the beamformed signal from the wireless device in one or more receive directions. The base station 110 and/or wireless device 120 may perform beam training and configuration operations to select receive and/or transmit beam directions for each of the base station 110 and/or wireless device 120. The transmit and receive directions for the base station 110 and/or wireless device 120 may be the same or the transmit and receive directions for the base station 110 and/or wireless device 120 may be different.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100a also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1A, a relay station 110d may communicate with macro the base station 110 and the wireless device 120 in order to facilitate communication between the base station 110 and the wireless device 120. A relay station also may be referred to as a relay base station, a relay base station, a relay, etc.

The communications system 100a may be a heterogeneous network that includes base stations of different types, for example, macro base stations, pico base stations, femto base stations, relay base stations, etc. These different types of base stations may have different transmit power levels, different coverage areas, and different impacts on interference in communications system 100a. For example, macro base stations may have a high transmit power level (for example, 5 to 40 Watts) whereas pico base stations, femto base stations, and relay base stations may have lower transmit power levels (for example, 0.1 to 2 Watts).

A network controller 132 may couple to a set of base stations and may provide coordination and control for these base stations. The network controller 132 may communicate with the base stations via a backhaul. The base stations also may communicate with one another, for example, directly or indirectly via a wireless or wireline backhaul.

The wireless devices 120 may be dispersed throughout communications system 100a, and each wireless device may be stationary or mobile. A wireless device also may be referred to as an access terminal, a terminal, a mobile station, a subscriber unit, a station, user equipment (UE), etc.

A macro base station 110 may communicate with the communication network 135 over a wired or wireless communication link 126. The wireless devices 120 may communicate with a base station 110-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100a include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some aspects may use terminology and examples associated with LTE technologies, some aspects may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to two streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120 may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some aspects, two or more wireless devices 120 may communicate directly using one or more sidelink channels 124 (for example, without using a base station 110-110d as an intermediary to communicate with one another). For example, wireless devices 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless devices 120 may perform scheduling operations, resource selection operations, as well as other operations described elsewhere herein as being performed by the base station 110.

In the example illustrated in FIG. 1A, wireless devices 120 (e.g., an apparatus, such as a UAV) may include a wireless communication manager 101. In various implementations and aspects, the wireless communication manager 101 may be configured to perform operations for managing wireless communications by the apparatus (e.g., a UAV), such as described with reference to FIGS. 3A, 3B, 3E, 4A, 4B, and 5. In various implementations and aspects, the wireless communication manager 101 may be configured to obtain an altitude of the apparatus (e.g., a UAV), send a message using beamformed transmissions 132a in response to the altitude of the apparatus meeting an altitude threshold. In various implementations and aspects, the wireless communication manager 101 may be further configured to send the message using omnidirectional transmissions 134 in response to the altitude of the apparatus failing to meet the altitude threshold.

Figure 1B:
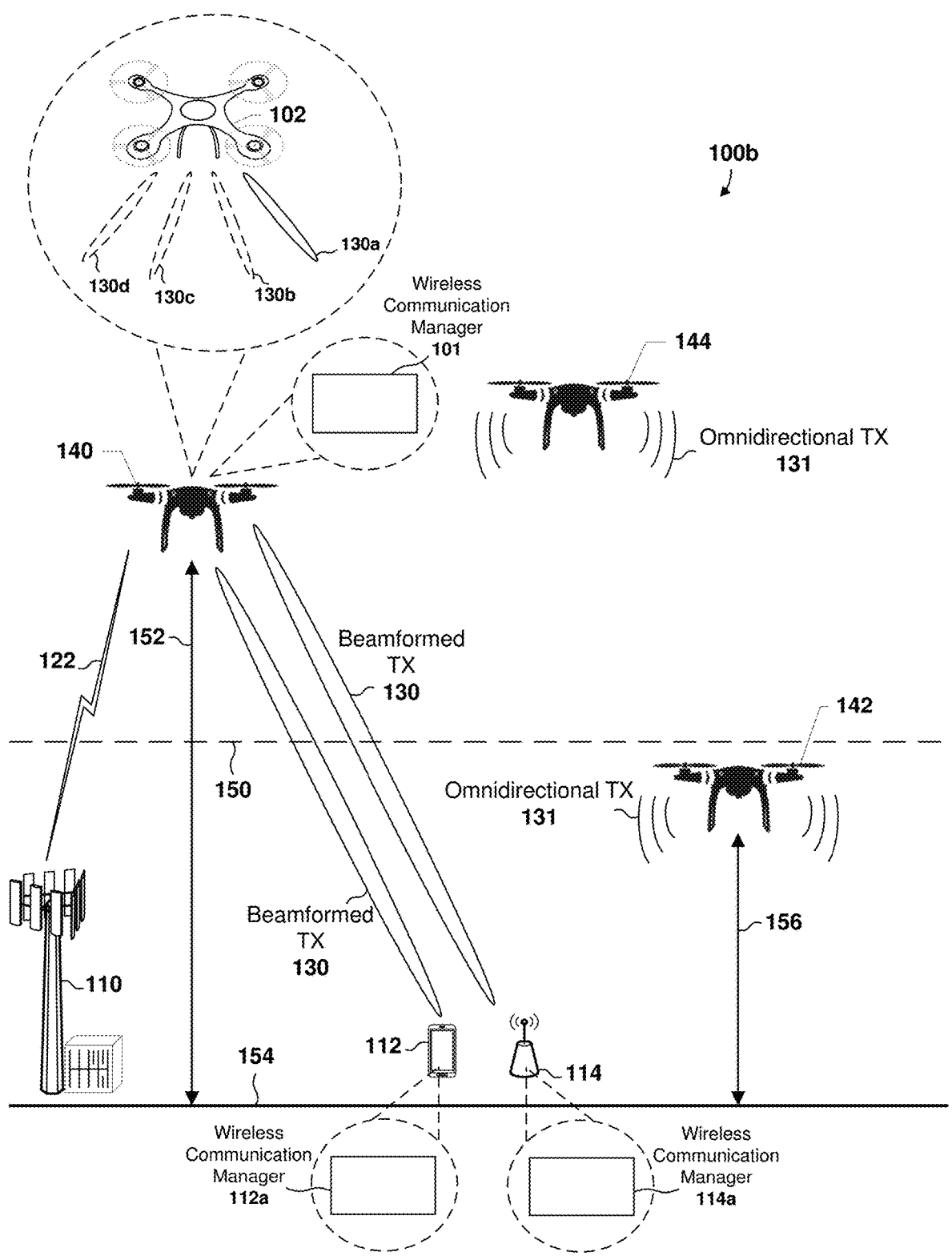
FIG. 1B is a conceptual diagram illustrating aspects of a system for managing a broadcast signal of an apparatus suitable for implementing various implementations and aspects.

FIG. 1B is a conceptual diagram illustrating aspects of a system 100b for managing a broadcast signal of an apparatus (e.g., a UAV) suitable for implementing various implementations and aspects. Apparatuses (e.g., UAVs 140, 142, 144) may send wireless communications to and receive wireless communications from other devices for a variety of purposes. Such wireless communications may be to or from another apparatus (e.g., between or among UAVs 140, 142, and 144), or to or from a device on the ground (e.g., a user equipment (UE) such as a mobile device 112, a base station 114, and the like, collectively referred to herein as a "ground receiver"). One example of wireless communications received from or transmitted to another apparatus is a message indicating the apparatus's current and planned behavior such as its path, altitude, velocity, maneuvers, and the like, generally referred to herein as a "maneuvering safety message." An example of a maneuvering safety message is a UAV-to-Everything Detect and Avoid (U2X-DAA) message. Other examples of wireless communications to or from another apparatus include data messages such as camera or other sensor information, maneuvering messages such as swarm behavior messages, and other suitable apparatus-to-apparatus (e.g., UAV-to-UAV) communications. One example of wireless communications received from or transmitted to a ground receiver is a message including identity information and/or location information of the apparatus (referred to herein as an "identification message"). In some aspects, an identification message may be used by automated or semi-automated air traffic control systems, governmental agencies such as law enforcement, and the like. An example of an identification message is a U2X-ID message. Maneuvering safety messages and identification messages typically are subject to different requirements for latency, range of transmission, rate of generation and transmission (e.g., to update information in a message), and are intended for different receiving devices. In some implementations and aspects, the apparatus 140, 142, 144 may be configured to transmit the maneuvering safety message or the identification message over a sidelink communication link.

In some aspects, the apparatus (e.g., 140, which may be a UAV) may include the wireless communication manager 101. In various aspects, the wireless communication manager 101 may be configured to perform operations for managing the transmission of maneuvering safety messages or identification messages as described herein, such as described with reference to FIGS. 3A, 3B, 3E, 4A, 4B, and 5. In various aspects, the wireless communication manager 101 may be configured to obtain an altitude of the apparatus. In various aspects, the wireless communication manager 101 may be configured to send a message using beamformed transmissions in response to the altitude of the apparatus meeting an altitude threshold. In various aspects, the wireless communication manager 101 may be configured to send the message using omnidirectional transmissions in response to the altitude of the apparatus failing to meet the altitude threshold.

In various implementations and aspects, an apparatus (e.g., 140, 142, 144, which may be a UAV) may be configured to configure and transmit a message as omnidirectional transmissions or beamformed transmissions based on various factors, including a type of message to be sent, a direction of transmission, an altitude of the apparatus, beam width, multi subframe allocation, and beam sweep. In this manner, the apparatus may configure a transmission at a physical (PHY) layer based on the various factors.

In some implementations and aspects, the apparatus may send a message using either omnidirectional transmissions (e.g., 131) or beamformed transmission (e.g., 130) based on whether the altitude of the apparatus meets an altitude threshold. For example, the altitude 152 of the apparatus (e.g., UAV) 140 (i.e., above the ground 154) meets (e.g., is greater than, or is greater than or equal to) an altitude threshold 150. As another example, the altitude 156 of the apparatus (e.g., UAV) 142 fails to meet (does not meet) the altitude threshold 150. In some implementations and aspects, the apparatus 140, 142, 144 may obtain its altitude from various sources, for example from an altitude sensor aboard the apparatus, such as barometer information, from a global navigation satellite system receiver, such altitude derived from three-dimensional global coordinates. In some implementations and aspects, the apparatus 140, 142, 144 may obtain its altitude from a network element that provides the altitude of the apparatus, for example, via a communication link 122 with a base station 110, which may be an element of a communication network (e.g., communications system 110a).

In some implementations and aspects, the apparatus 140, 142, 144 may determine the altitude threshold dynamically. For example, the apparatus 140, 142, 144 may determine a type of a message to be transmitted (e.g., a maneuvering safety message or an identification message) and may select the altitude threshold based on the determined message type. For example, in response to determining that message is of a type for reception by a ground receiver 112, 114 (e.g., an identification message), the apparatus may 140, 142, 144 select the altitude threshold 150. As another example, in response to determining that the message is for reception by other apparatuses, the apparatus may 140, 142, 144 select an altitude threshold that is very low, or zero. In some implementations and aspects, the apparatus may configure or select the altitude threshold using a setting or parameter, which may be referred to for example, as a "Beamforming_HeightThreshold" parameter or another suitable parameter.

In some implementations and aspects, the apparatus may select the altitude threshold based on capabilities of various devices of the apparatus and/or environmental conditions. For example, the apparatus may select the altitude threshold based on a transmit power capability of a transmit chain or a radio module of the apparatus. As another example, the apparatus may select the altitude threshold based on a stored power level in a battery or power module of the apparatus. As another example, the apparatus may select the altitude threshold based on beamforming capabilities of a transmission device of the apparatus. In some implementations and aspects, the apparatus may determine a level or an amount of radio frequency interference proximate to the apparatus, and may select the altitude threshold based on the level or amount of radio frequency interference. In some implementations and aspects, the apparatus may determine a level or an amount of communication link congestion or network congestion, and may select the altitude threshold based on the level or amount of communication link congestion or network congestion. The apparatus may also determine other factors and consider such factors in selecting the altitude threshold.

In some implementations and aspects, the apparatus may send a message using either omnidirectional transmissions (e.g., 131) or beamformed transmission (e.g., 130) based on whether the message includes a message for reception by a first type of other (second) apparatuses (e.g., other UAVs) or a message for reception by a second type of other (second) apparatuses (e.g., a ground receiver). For example, the apparatus 142 may send the message using omnidirectional transmission 131 in response to determining that the message is for reception by a first type of other apparatuses. As another example, the apparatus 144 may send the message using omnidirectional transmissions 131 in response to determining that the message is for reception by a second type of other apparatuses. In some implementations and aspects, the apparatus 144 may send the message using the message using omnidirectional transmission 131 even though the apparatus 144 meets the altitude threshold 150.

As another example, the apparatus 140 may send the message using beamformed transmissions 130 based on the message being for reception by the second type of second apparatus (e.g., to a ground receiver 112 or to a ground receiver 114). In some implementations and aspects, the apparatus 140 may send the message using beamformed transmissions 130 in directional beams (e.g., 130a, 130b, 130, and 130d) aimed in at least two different directions. In some implementations and aspects, the apparatus 140 may transmit the directional beams from the apparatus in four quadrants, or in more directions from the apparatus.

In some implementations and aspects, the apparatus may transmit the directional beams (e.g., aimed, directed) in at least two different directions within a latency constraint of the message. For example, an identification message may have a latency requirement of transmission once per second. In this example, the apparatus may transmit all of the directional beams (e.g., 130a-130d) within the latency requirement (e.g., 1 second). In some implementations and aspects, the apparatus may allocate communication link resources over multiple time slots and/or multiple subframes to transmit the directional beams. In some implementations and aspects, the apparatus may allocate frequency resources and subframes as part of a Semi-Persistent Scheduling (SPS) process. In some implementations and aspects, the apparatus may utilize an SPS parameter (which may be referred to as a "MultiSubframeAllocation" parameter) that indicates that the apparatus should allocate frequency resources, and an SPS parameter (which may be referred to as a "NumSubframe_BeamSweep" parameter) that indicates a number of subframes in which the apparatus should allocate frequency resources. In some implementations and aspects, the apparatus may configure the subframes close enough in time to comply with a latency requirement of a message or signal. In some implementations and aspects, the apparatus specify parameters for the type of message to be sent, an identification of the direction(s) of beamformed signals and/or the number of beamformed transmissions to be send, and a beam width of each beamformed transmission.

In some implementations and aspects, the apparatus may include in beamformed transmissions a beam identifier that is configured to enable a receiver device (e.g., the ground receiver 112, 114) to obtain the beam identifier of the direction beam used to transmit the beamformed transmissions. In some implementations and aspects, the receiver device may use the beam identifier to send a signal back to the apparatus, e.g., by a beamformed transmission, requesting retransmission of a message or packet (e.g., in the event that the receiver device was unable to properly decode a message or packet received from the apparatus). In some implementations and aspects, the receiver device may include the beam identifier in the retransmission request. In some implementations and aspects, the apparatus may receive the retransmission request from the receiver device, and may retransmit the message using beamformed transmissions associated with the beam identifier. In this manner, the apparatus may efficiently retransmit the message only in the direction of the requesting receiver device, without retransmitting other beamformed transmissions in other directions. Further, the apparatus may dynamically determine whether to retransmit a message or signal based on the apparatus's altitude, which may change from time to time. In some implementations and aspects, the apparatus may receive a retransmission request from the receiver device, and may retransmit the message using omnidirectional transmissions when the altitude of the apparatus does not meet the altitude threshold. In some implementations and aspects, the apparatus may retransmit the message using beamformed transmissions when the altitude of the apparatus meets the altitude threshold.

Figure 1C:
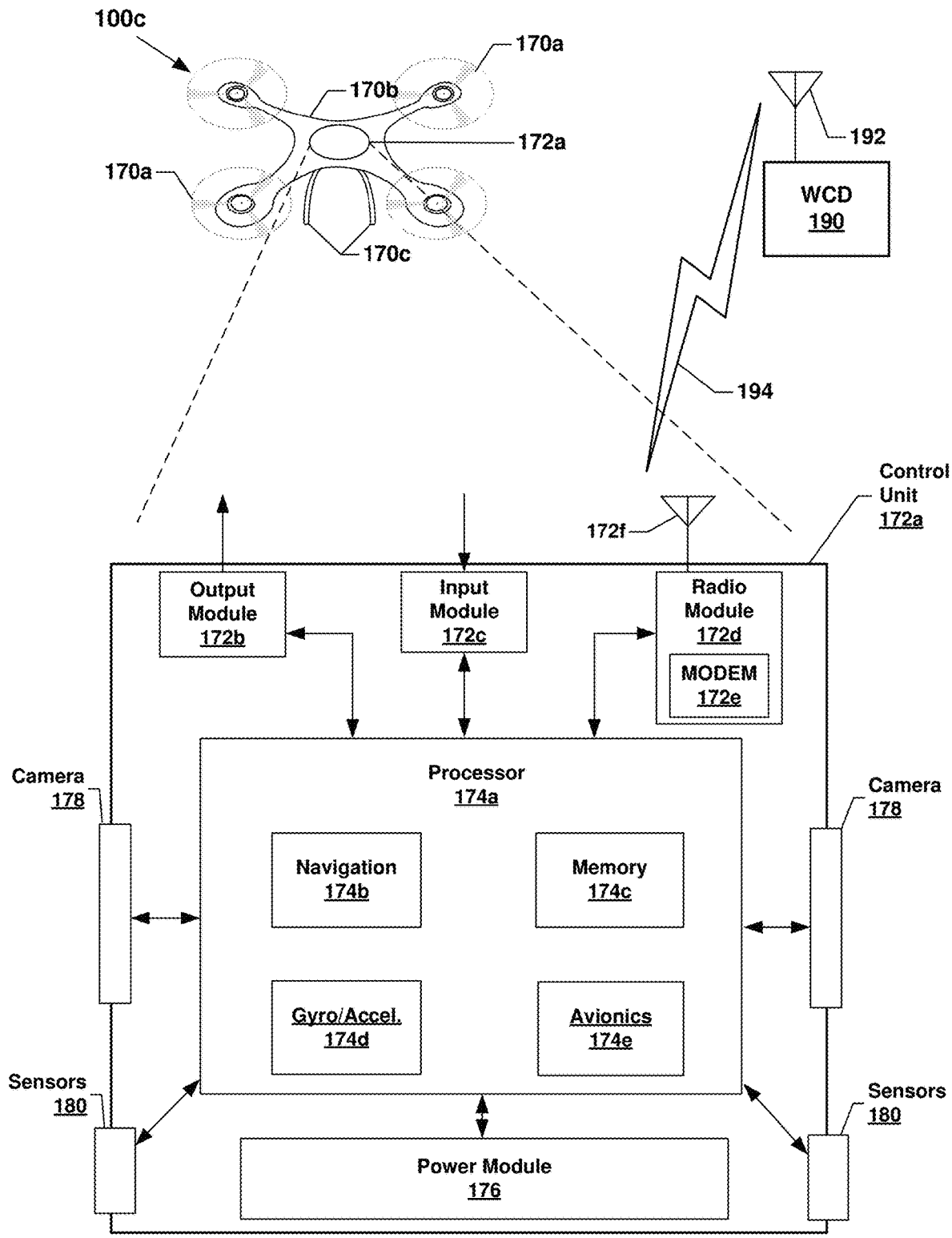
FIG. 1C is a component block diagram illustrating examples component of an apparatus suitable for implementing various implementations and aspects.

FIG. 1C is a component block diagram illustrating example components of an apparatus 100c (which may be, for example, a UAV) suitable for implementing various implementations and aspects. With reference to FIGS. 1A-1C, the apparatus 100c (e.g., a UAV) may include a number of rotors 170a, a frame 170b, and landing columns 170c or skids. The frame 170b may provide structural support for the motors associated with the rotors 170a. The landing columns 170c may support the maximum load weight for the combination of the components of the apparatus 100c and, in some cases, a payload. For ease of description and illustration, some detailed aspects of the apparatus 100c are omitted such as wiring, frame structure interconnects, or other features that would be known to one of skill in the art. For example, while the apparatus 100c is shown and described as having a frame 170b having a number of support members or frame structures, the apparatus 100c may be constructed using a molded frame in which support is obtained through the molded structure.

While the illustrated apparatus 100c has four rotors 170a, this is merely exemplary and various implementations and aspects may include more or fewer than four rotors 170a.

The apparatus 100c may further include a control unit 172a that may house various circuits and devices used to power and control the operation of the apparatus 100c. The control unit 172a may include a processor 174a, a power module 176, sensors 180, one or more cameras 178, an output module 172b, an input module 172c, and a radio module 172d.

The processor 174a may be configured with processor-executable instructions to control travel and other operations of the apparatus 100c, including operations of various implementations and aspects. The processor 174a may include or be coupled to a navigation unit 174b, a memory 174c, a gyro/accelerometer unit 174d, and an avionics module 174e. The processor 174a and/or the navigation unit 174b may be configured to communicate with a server through a wireless connection (e.g., a cellular data network) to receive data useful in navigation, provide real-time position reports, and assess data.

The avionics module 174e may be coupled to the processor 174a and/or the navigation unit 174b, and may be configured to provide travel control-related information such as altitude, attitude, airspeed, heading, and similar information that the navigation unit 174b may use for navigation purposes, such as dead reckoning between Global Navigation Satellite System (GNSS) position updates. The gyro/accelerometer unit 174d may include an accelerometer, a gyroscope, an inertial sensor, or other similar sensors. The avionics module 174e may include or receive data from the gyro/accelerometer unit 174d that provides data regarding the orientation and accelerations of the apparatus 100c that may be used in navigation and positioning calculations, as well as providing data used in various implementations and aspects for processing images.

The processor 174a may further receive additional information from the sensors 180, such as an image sensor or optical sensor (e.g., a sensor capable of sensing visible light, infrared, ultraviolet, and/or other wavelengths of light). The sensors 180 may also include a radio frequency (RF) sensor, a barometer, a humidity sensor, a sonar emitter/detector, a radar emitter/detector, a microphone or another acoustic sensor, a lidar sensor, a time-of-flight (TOF) 3-D camera, or another sensor that may provide information usable by the processor 174a for movement operations, navigation and positioning calculations, and determining environmental conditions. The sensors 180 may also include one or more sensors configured to detect temperatures generated by one or more components of the robotic vehicle, such as thermometers, thermistors, thermocouples, positive temperature coefficient sensors, and other sensor components.

The power module 176 may include one or more batteries that may provide power to various components, including the processor 174a, the sensors 180, the one or more cameras 178, the output module 172b, the input module 260, and the radio module 172d. In addition, the power module 176 may include energy storage components, such as rechargeable batteries. The processor 174a may be configured with processor-executable instructions to control the charging of the power module 176 (i.e., the storage of harvested energy), such as by executing a charging control algorithm using a charge control circuit. Alternatively or additionally, the power module 176 may be configured to manage its own charging. The processor 174a may be coupled to the output module 172b, which may output control signals for managing the motors that drive the rotors 170a and other components.

The apparatus 100c may be controlled through control of the individual motors of the rotors 170a as the apparatus 100c progresses toward a destination. The processor 174a may receive data from the navigation unit 174b and use such data in order to determine the present position and orientation of the apparatus 100c, as well as the appropriate course towards the destination or intermediate sites. In various implementations and aspects, the navigation unit 174b may include a GNSS receiver system (e.g., one or more global positioning system (GPS) receivers) enabling the apparatus 100c to navigate using GNSS signals. Alternatively or in addition, the navigation unit 174b may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic vehicles, etc.

The radio module 172d may be configured to receive navigation signals, such as signals from aviation navigation facilities, etc., and provide such signals to the processor 174a and/or the navigation unit 174b to assist in robotic vehicle navigation. In various implementations and aspects, the navigation unit 174b may use signals received from recognizable RF emitters (e.g., AM/FM radio stations, Wi-Fi access points, and cellular network base stations) on the ground.

The navigation unit 174b may include a planning application that may perform calculations to plan a path of travel for the robotic vehicle within a volumetric space ("path planning"). In some implementations and aspects, the planning application may perform path planning using information including information about aspects of a task to be performed by the robotic vehicle, information about environmental conditions, an amount of heat that may be generated by one or more components of the robotic vehicle in performing the task, as well as one or more thermal constraints.

The radio module 172d may include a modem 172e and a transmit/receive antenna 172f. The radio module 172d may be configured to conduct wireless communications via a variety of wireless communication devices (e.g., a wireless communication device (WCD) 190), examples of which include a wireless telephony base station or cell tower (e.g., a base station 126), a network access point (e.g., an access point 114), a beacon, a smartphone, a tablet, or another computing device with which the apparatus 100c may communicate. The processor 174a may establish a bi-directional wireless communication link 194 via the modem 172e and the antenna 172f of the radio module 172d and the WCD 190 via a transmit/receive antenna 192. In some implementations and aspects, the radio module 172d may be configured to support multiple connections with different wireless communication devices using different radio access technologies.

In various implementations and aspects, the WCD 190 may be connected to a server through intermediate access points. In an example, the WCD 190 may be a server of a robotic vehicle operator, a third-party service (e.g., package delivery, billing, etc.), or a site communication access point. The apparatus 100c may communicate with a server through one or more intermediate communication links, such as a wireless telephony network that is coupled to a wide area network (e.g., the Internet) or other communication devices.

In some implementations and aspects, the apparatus 100c may include and employ other forms of radio communication, such as mesh connections with other robotic vehicles or connections to other information sources (e.g., balloons or other stations for collecting and/or distributing weather or other data harvesting information).

In various implementations and aspects, the control unit 172a may be equipped with an input module 172c, which may be used for a variety of applications. For example, the input module 172c may receive images or data from an onboard camera 178 or sensors 180, or may receive electronic signals from other components (e.g., a payload).

While various components of the control unit 172a are illustrated as separate components, some or all of the components (e.g., the processor 174a, the output module 172b, the radio module 172d, and other units) may be integrated together in a single device or module, such as a system-on-chip module.

Figure 2:
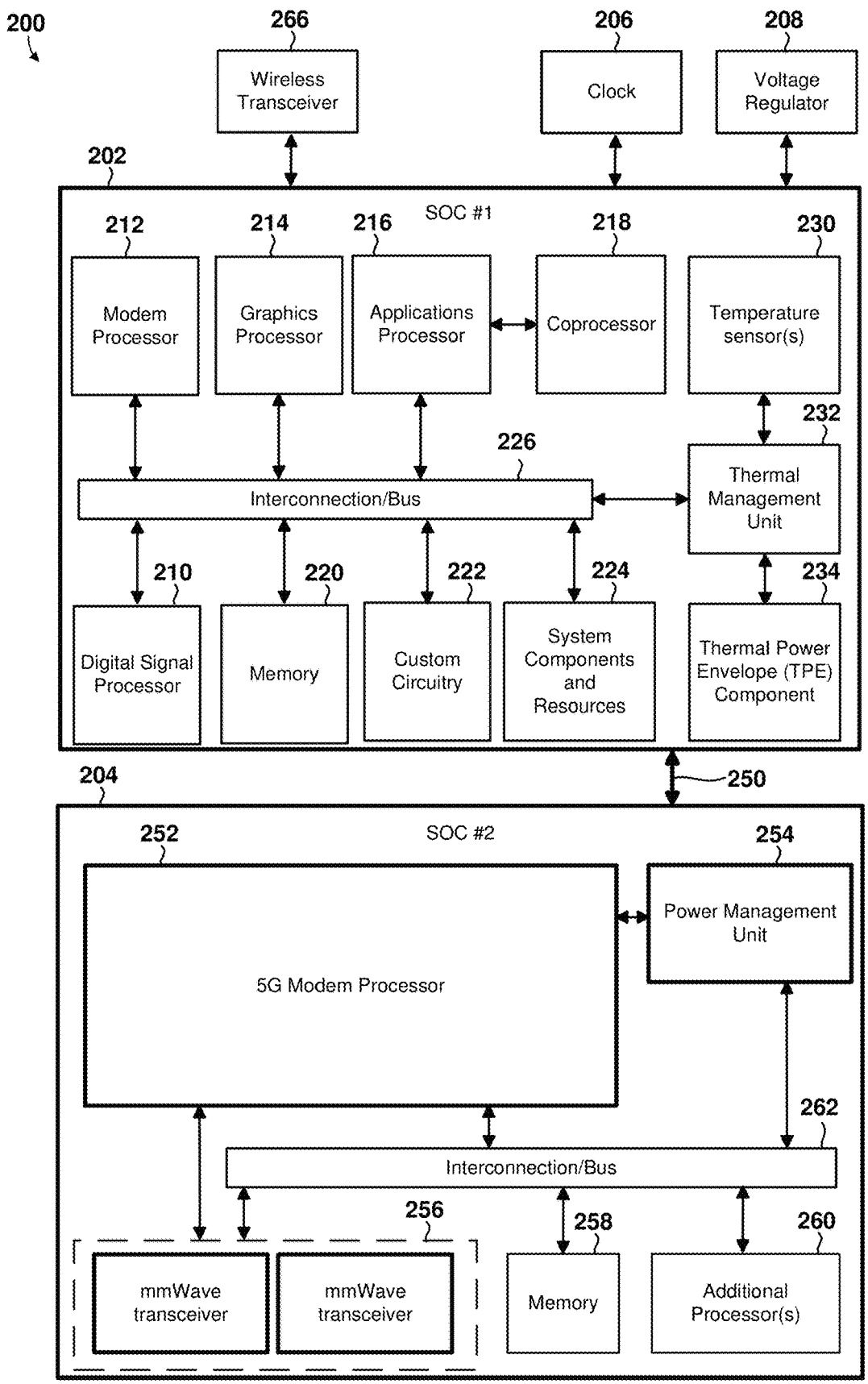
FIG. 2 is a component block diagram illustrating an example computing and wireless modem system suitable for implementing various implementations and aspects.

FIG. 2 is a component block diagram illustrating an example computing and wireless modem system 200 suitable for implementing various implementations and aspects. Various implementations and aspects may be implemented on a number of single processor and multiprocessor computer systems, including a system-on-chip (SOC) or system in a package (SIP).

With reference to FIGS. 1A-2, the illustrated example computing system 200 (which may be a SIP in some implementations and aspects) includes a two SOCs 202, 204 coupled to a clock 206, a voltage regulator 208, and a wireless transceiver 266 configured to send and receive wireless communications via an antenna (not shown) to/from wireless devices, such as a base station 126. In some implementations and aspects, the first SOC 202 may operate as central processing unit (CPU) of the wireless device that carries out the instructions of software application programs by performing the arithmetic, logical, control and input/output (I/O) operations specified by the instructions. In some implementations and aspects, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz millimeter wave (mmWave) spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 262, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, macOS, etc.) and a processor that executes a second type of operating system (such as Microsoft Windows). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 262. The interconnection/bus module 226, 250, 262 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example computing system 200 discussed above, some implementations and aspects may be implemented in a wide variety of computing systems, which may include a single processor, multiple processors, multi-core processors, or any combination thereof.

Figure 3A:
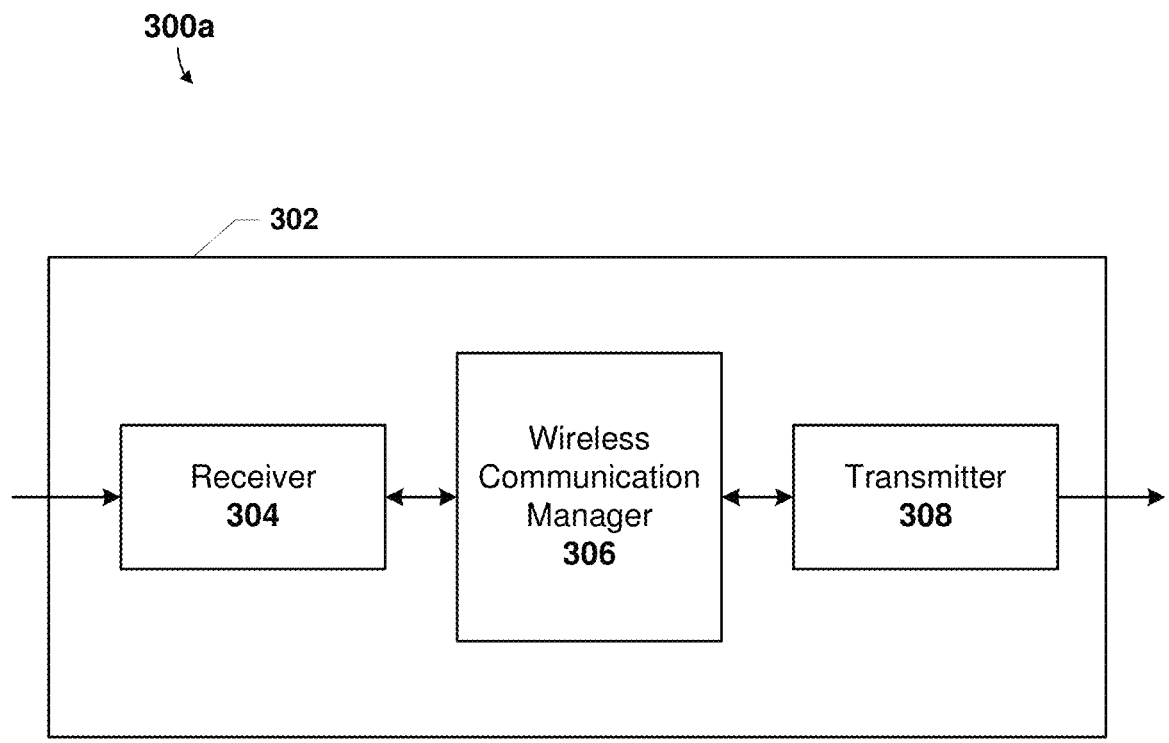
FIG. 3A illustrates a block diagram of a device that supports managing a broadcast signal according to various aspects.

FIG. 3A illustrates a block diagram 300a of a device 302 that supports managing a broadcast signal according to various aspects. With reference to FIGS. 1-3A, the device 302 is an example of aspects of an apparatus 140, 142, 144 (e.g., a UAV). Device 302 may include a receiver 304, a wireless communication manager 306, and a transmitter 308.

The receiver 304 may receive information, such as packets, control information, etc., associated with RF communications. The receiver 304 may be an example of aspects of radio module 172d, or transceiver 256 or 266. The transmitter 308 may send information, such as packets, control information, etc., associated with RF communications. The transmitter 308 may be an example of aspects of radio module 172d, or transceiver 256 or 266.

The wireless communication manager 306 may be an example of aspects of wireless communication manager 101 and processor 174a. The wireless communication manager 306 may obtain an altitude of the apparatus, and send a message using beamformed transmissions in response to the altitude of the apparatus meeting an altitude threshold. The wireless communication manager 306 may send the message using omnidirectional transmissions in response to the altitude of the apparatus failing to meet the altitude threshold. The wireless communication manager 306 may obtain the altitude of the apparatus from one or more of an altitude sensor, apparatus barometer information, a global navigation satellite system receiver, or a network element that provides the altitude of the apparatus (e.g., 172d, 172f, 174b, 174d, 174e, 178, 180). The wireless communication manager 306 may determine a type of the message, and select the altitude threshold based on the determined type of the message.

The wireless communication manager 306 may determine whether the message includes a message for reception by a first type of second apparatus or a message for reception by a second type of second apparatus, and send the message using beamformed transmission in response to determining that the message is for reception by the second type of second apparatus and the altitude meets the altitude threshold. The wireless communication manager 306 may send and/or receive a maneuvering safety message and/or an identification message.

The wireless communication manager 306 may send the message using beamformed transmissions in directional beams in at least two different directions. The wireless communication manager 306 may send the message using beamformed transmissions in directional beams in at least two different directions within a latency constraint of the message. The wireless communication manager 306 may send the message using beamformed transmissions in directional beams in at least two different directions via a sidelink communication link. The wireless communication manager 306 may include in beamformed transmissions a beam identifier that enables a receiver device to obtain the beam identifier of a directional beam used to transmit a received beamformed transmission.

The wireless communication manager 306 may receive from a second apparatus a retransmission request including the beam identifier of the received beamformed transmission, and retransmit the message using beamformed transmissions associated with the beam identifier. The wireless communication manager 306 may receive from a receiver device a retransmission request, and retransmit the message using omnidirectional transmissions when the altitude of the apparatus fails to meet the altitude threshold. The wireless communication manager 306 may retransmit the message using beamformed transmissions when the altitude of the apparatus meets the altitude threshold.

Figure 3B:
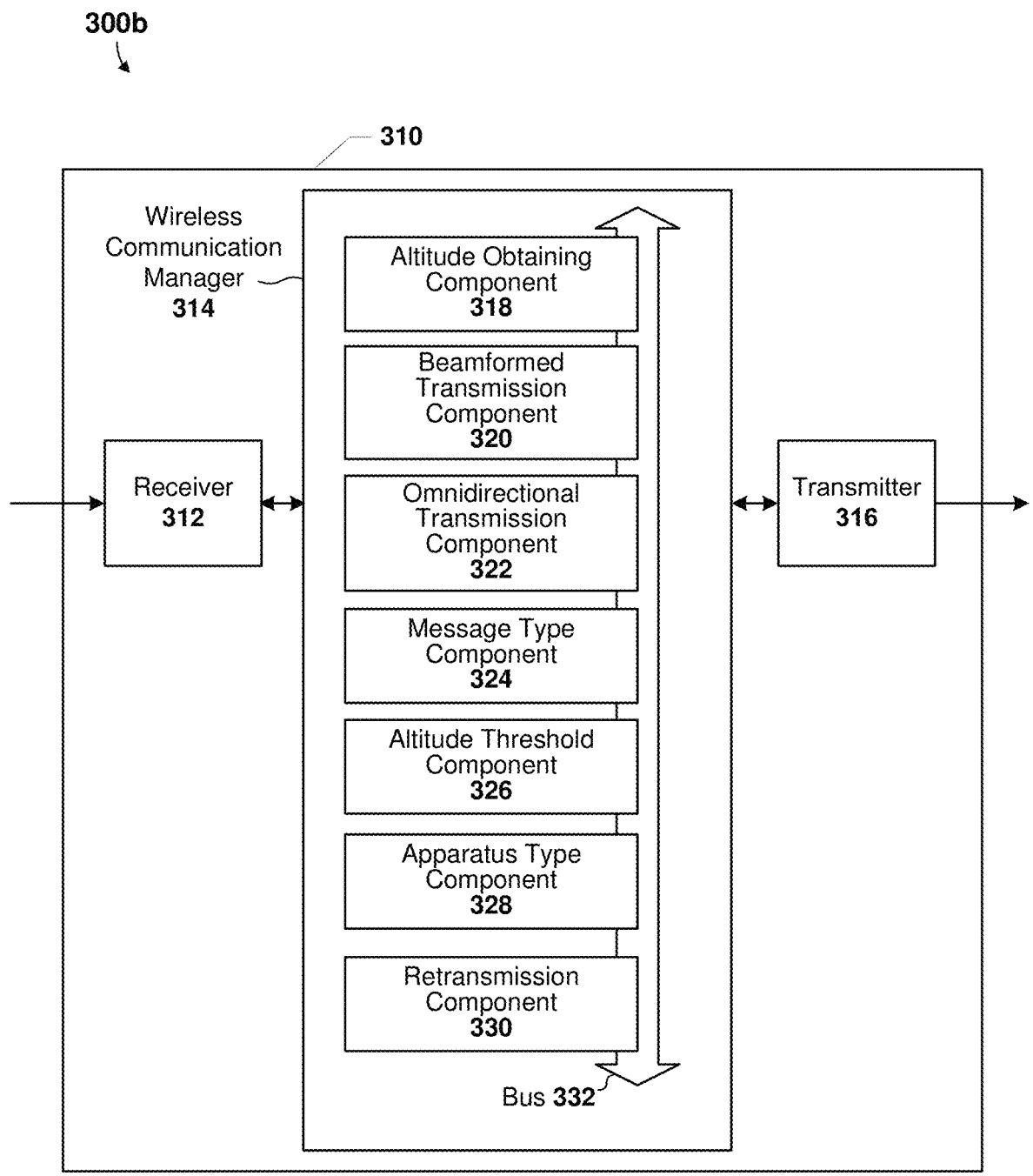
FIG. 3B illustrates a block diagram of a device that supports managing a broadcast signal according to various aspects.

FIG. 3B illustrates a block diagram 300b of a device 310 that supports managing a broadcast signal according to various aspects. With reference to FIGS. 1-3B, device 310 may be an example of aspects of an apparatus 140, 142, 144 (e.g., UAV). Device 310 may include a receiver 312, a wireless communication manager 314, and a transmitter 316. Device 310 may also include a processor. Each of the components of device 310 may be in communication with one another such as via one or more buses or other suitable connections.

The receiver 312 may receive information, such as packets, control information, etc., associated with RF communications. The receiver 312 may be an example of aspects of radio module 172d, or transceiver 256 or 266. The transmitter 316 may send information, such as packets, control information, etc., associated with RF communications. The transmitter 316 may be an example of aspects of radio module 172d, or transceiver 256 or 266.

The wireless communication manager 314 may be an example of aspects of wireless communication manager 101, 112a, 114a, and processor 174a. The wireless communication manager 314 also may include an altitude component 318, a beamformed transmission component 320, an omnidirectional transmission component 322, a message type component 324, an altitude threshold component 326, an apparatus type component 328, and a retransmission component 330. Each of the components of the wireless communication manager 314 may be in communication with one another (e.g., via one or more buses 332 or other suitable connections).

The altitude obtaining component 318 may obtain an altitude of the apparatus, such as from one or more of an altitude sensor, apparatus barometer information, a global navigation satellite system receiver, or a network element that provides the altitude of the apparatus. The beamformed transmission component 320 may send a message using beamformed transmissions in response to the altitude of the apparatus meeting an altitude threshold. The beamformed transmission component 320 may send the message using beamformed transmission in response to determining that the message is for reception by the second type of second apparatus and the altitude meets the altitude threshold. The beamformed transmission component 320 may send the message using beamformed transmissions in directional beams in at least two different directions. The beamformed transmission component 320 may send the message using beamformed transmissions in directional beams in at least two different directions within a latency constraint of the message. The beamformed transmission component 320 may send the message using beamformed transmissions in directional beams in at least two different directions via a sidelink communication link. The beamformed transmission component 320 may include in beamformed transmissions a beam identifier that enables a receiver device to obtain the beam identifier of a directional beam used to transmit a received beamformed transmission. The omnidirectional transmission component 322 may send the message using omnidirectional transmissions in response to the altitude of the apparatus failing to meet the altitude threshold.

The message type component 324 may determine a type of the message, such as a maneuvering safety message, an identification message, and/or another type of message. The message type component 324 may determine whether the message includes a message for reception by a first type of second apparatus or a message for reception by a second type of second apparatus. The message type component 324 may determine that the message for reception by the first type of second apparatus is a maneuvering safety message and/or the message for reception by the second type of second apparatus is an identification message. The altitude threshold component 326 may select the altitude threshold based on the determined type of the message.

The retransmission component 330 may receive from a second apparatus a retransmission request. The retransmission component 330 may receive from a second apparatus a retransmission request including the beam identifier of the received beamformed transmission. The beamformed transmission component 320 may retransmit the message using beamformed transmissions associated with the beam identifier. The beamformed transmission component 320 may retransmit the message using beamformed transmissions when the altitude of the apparatus meets the altitude threshold. The omnidirectional transmission component 322 may retransmit the message using omnidirectional transmissions when the altitude of the apparatus fails to meet the altitude threshold.

Figure 3C:
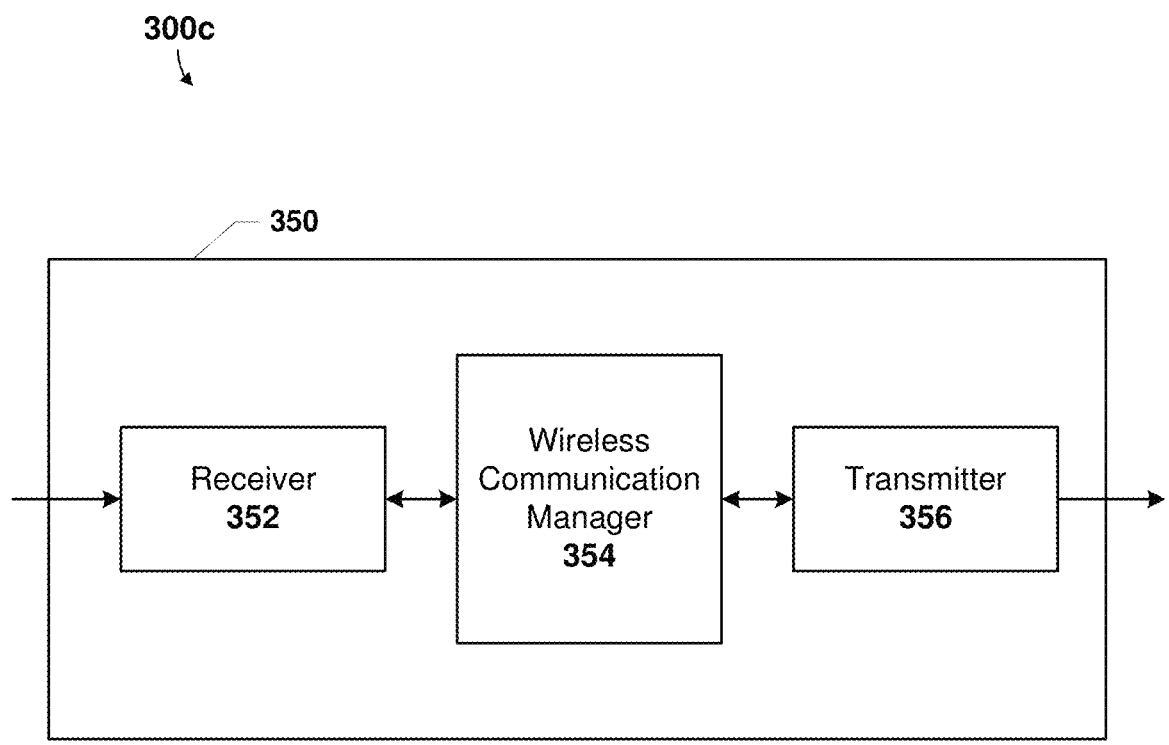
FIG. 3C illustrates a block diagram of a device that supports managing a broadcast signal according to various aspects.

FIG. 3C illustrates a block diagram 300c of a device 350 that supports managing a broadcast signal according to various aspects. With reference to FIGS. 1-3C, device 350 is an example of aspects of an apparatus 112, 114 (e.g., a ground receiver). Device 350 may include a receiver 352, a wireless communication manager 354, and a transmitter 356.

The receiver 352 may receive information, such as packets, control information, etc., associated with RF communications. The receiver 352 is an example of aspects of radio module 172d, or transceiver 256 or 266. The transmitter 356 may send information, such as packets, control information, etc., associated with RF communications. The transmitter 356 may be an example of aspects of radio module 172d, or transceiver 256 or 266.

The wireless communication manager 354 is an example of aspects of wireless communication manager 112a and 114a. The wireless communication manager 354 may receive beamformed transmissions from a second apparatus, obtain a beam identifier of a directional beam of beamformed transmissions in response to unsuccessfully decoding the message, and transmit to the second a retransmission request in beamformed transmissions using the obtained beam identifier.

Figure 3D:
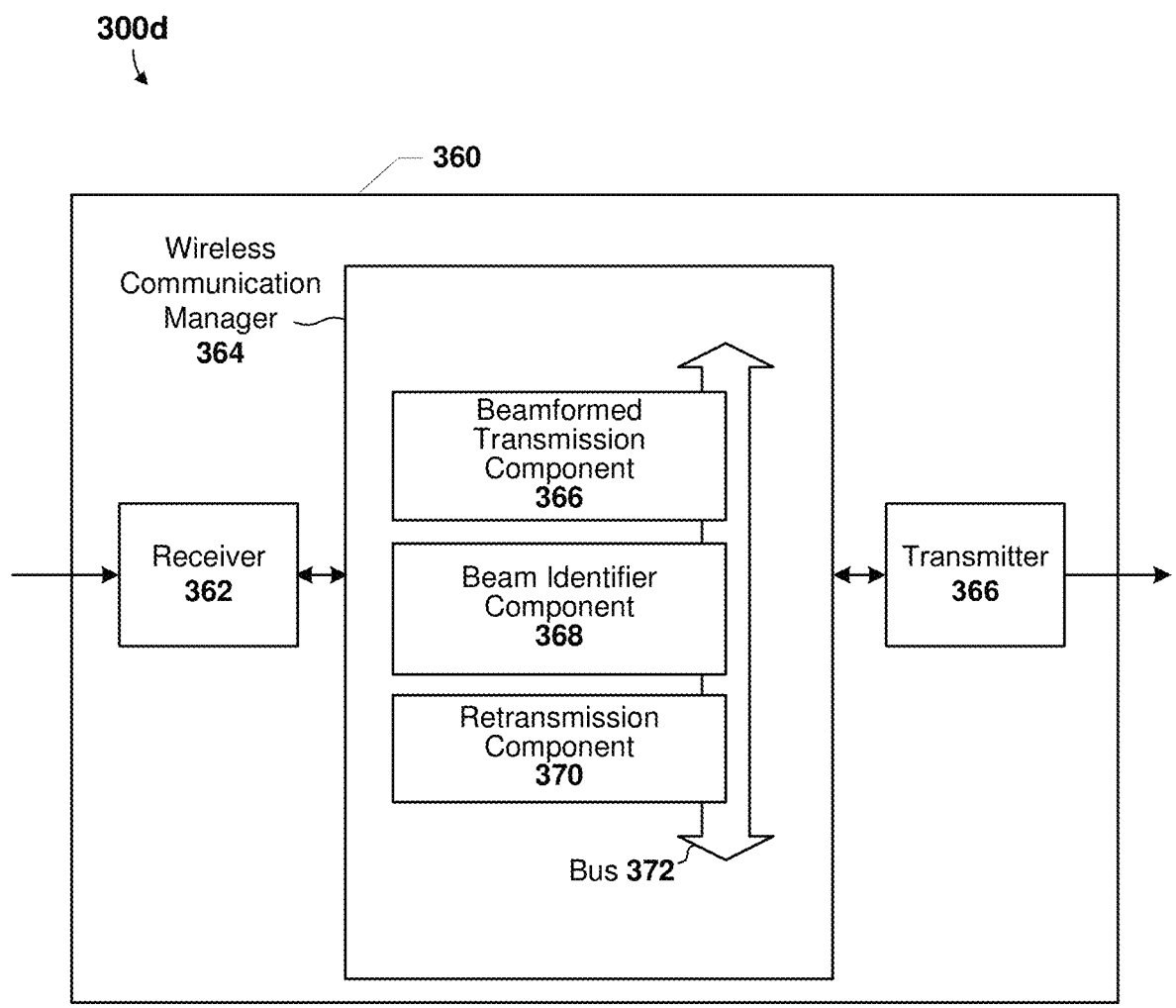
FIG. 3D illustrates a block diagram of a device that supports managing a broadcast signal according to various aspects.

FIG. 3D illustrates a block diagram 300d of a device 360 that supports managing a broadcast signal according to various aspects. With reference to FIGS. 1-3D, device 302 is an example of aspects of an apparatus 112, 114 (e.g., a ground receiver). Device 360 may include a receiver 362, a wireless communication manager 364, and a transmitter 366. Device 360 may also include a processor. Each of the components of device 360 may be in communication with one another (e.g., via one or more buses or other suitable connections).

The receiver 362 may receive information, such as packets, control information, etc., associated with RF communications. The receiver 362 may be an example of aspects of radio module 172d, or transceiver 256 or 266. The transmitter 366 may send information, such as packets, control information, etc., associated with RF communications. The transmitter 366 is an example of aspects of radio module 172d, or transceiver 256 or 266.

The wireless communication manager 364 is an example of aspects of wireless communication manager 112a, 114a. The wireless communication manager 364 also may include beamformed transmissions component 366, a beam identifier 368, and a retransmission component 370. Each of the components of the wireless communication manager 364 may be in communication with one another (e.g., via one or more buses 372 or other suitable connections).

The beamformed transmission component 366 may receive beamformed transmissions from a second apparatus (e.g., a UAV 140, 142, 144). The beam identifier component 368 may obtain a beam identifier of a directional beam of beamformed transmissions in response to unsuccessfully decoding the message. The retransmission component may transmit to the second a retransmission request in beamformed transmissions using the obtained beam identifier.

Figure 3E:
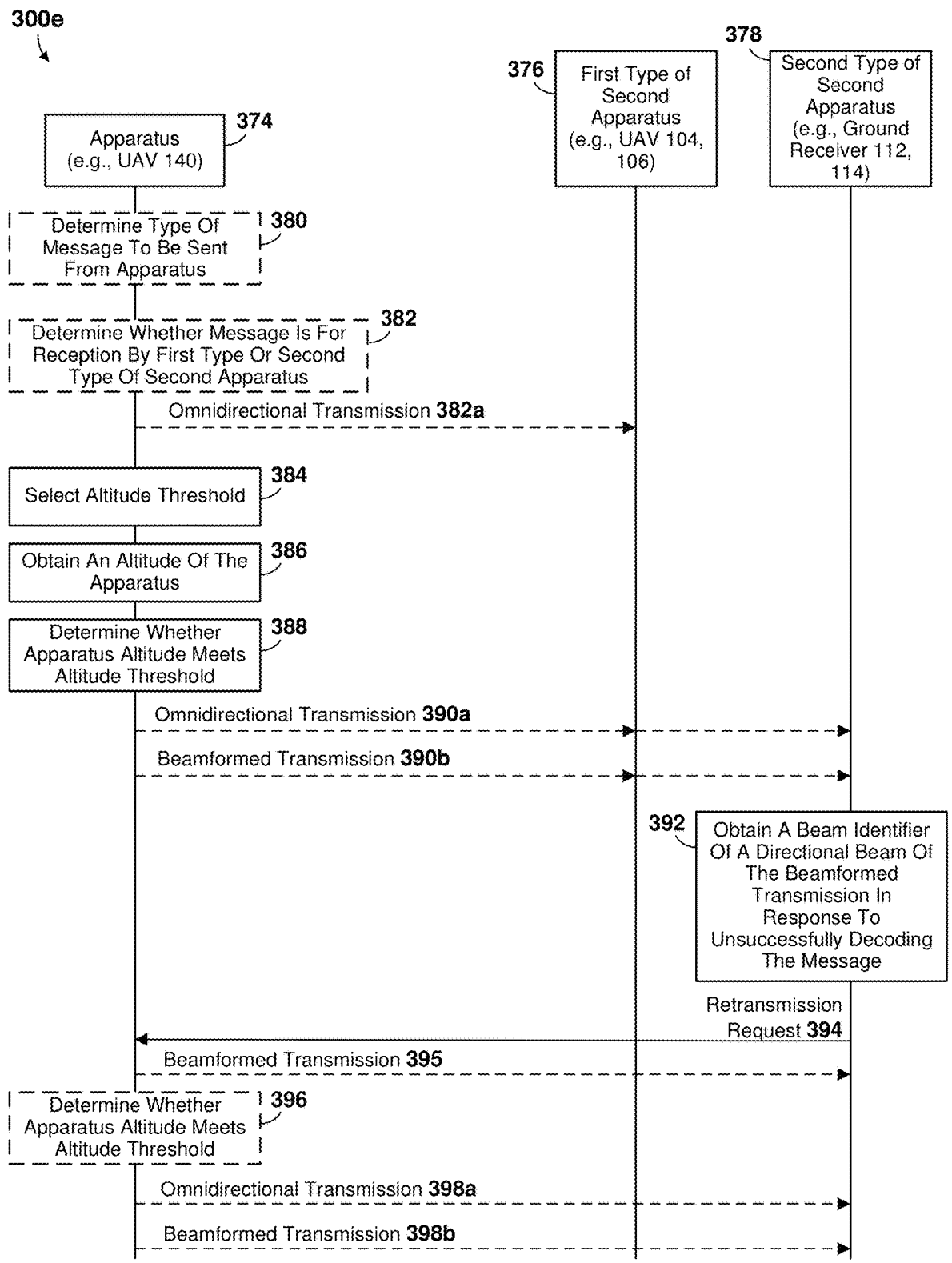
FIG. 3E illustrates example operations of a process flow that supports that supports managing a broadcast signal according to various aspects.

FIG. 3E illustrates example operations of a process flow 300e that supports that supports managing a broadcast signal according to various implementations and aspects. With reference to FIGS. 1A-3E, process flow 300e includes a first apparatus 374 (e.g., UAV 140), a first type of second apparatus 376 (e.g., UAV 104, 106), and a second type of second apparatus 378 (e.g., ground receiver 112, 114).

At 380, the apparatus 374 (e.g., a UAV) optionally may determine a type of message to be sent from the apparatus. For example, the apparatus may determine that the message to be sent is a maneuvering safety message or an identification message. At 382, the apparatus 374 optionally may determine whether the message is for reception by the first type of second apparatus 376 or the second type of apparatus 378. In some implementations and aspects, the apparatus 374 may send the message using omnidirectional transmission 382a in response to determining that the message is for reception by the first type of second apparatus 376.

At 384, the apparatus 374 (e.g., a UAV) may select an altitude threshold. In some implementations and aspects, the apparatus 374 may select the altitude threshold based on the determined type of the message. In some implementations and aspects, the apparatus 374 may select an altitude threshold in response to determining that the message is intended for the first type of second apparatus 376.

At 386, the apparatus 374 (e.g., a UAV) may obtain an altitude of the apparatus. In various implementations and aspects, the apparatus 374 may obtain the altitude from one or more of a variety of sources, such as from an altitude sensor, apparatus barometer information, a global navigation satellite system receiver, a network element that provides the altitude of the apparatus, or another suitable source.

The apparatus 374 (e.g., a UAV) may send the message using omnidirectional transmissions 390a in response to the altitude of the apparatus failing to meet the altitude threshold (e.g., the altitude of the apparatus is less than the altitude threshold). The apparatus may send the message using beamformed transmissions 390b in response to the altitude of the apparatus meeting the altitude threshold (e.g., the altitude of the apparatus is greater than or equal to the threshold). In some implementations and aspects, the apparatus 374 may send the message using beamformed transmissions in response to the message being for reception by the second type of second apparatus and the altitude meeting the altitude threshold.

In some implementations and aspects, the apparatus 374 (e.g., a UAV) may send the message using beamformed transmissions 390b in directional beams in at least two different directions. In some implementations and aspects, the apparatus 374 may send the message using beamformed transmissions 390b in directional beams in at least two different directions within a latency constraint of the message. In some implementations and aspects, the apparatus 374 may send the message using beamformed transmissions 390b in directional beams in at least two different directions via a sidelink communication link. In some implementations and aspects, the apparatus 374 (e.g., a UAV) may include in beamformed transmissions 390b a beam identifier that enables a receiver device such as the first type of second apparatus 376 (e.g., a UAV) and/or the second type of second apparatus 378 (e.g., a ground receiver) to obtain the beam identifier of a directional beam used to transmit the received beamformed transmission.

At 392, the second type of second apparatus 378 (e.g., a ground receiver) may obtain the beam identifier of the directional beam of the beamformed transmission 390b in response to unsuccessfully decoding the message. At 394, the second type of second apparatus 378 may transmit to the first apparatus 374 (e.g., a UAV) a retransmission request 394. In some implementations and aspects, the second type of second apparatus 378 may transmit the retransmission request 394 in a beamformed transmission using the obtained beam identifier.

At 395, the apparatus 374 (e.g., a UAV) may retransmit the message using the beamformed transmission 395 associated with the beam identifier (e.g., in response to receiving the retransmission request 394). In some implementations and aspects, the apparatus 374 optionally may retransmit the message using the beamformed transmission 395 without re-determining the altitude of the apparatus 374.

At 396, the apparatus 374 (e.g., a UAV) optionally may determine whether the altitude of the apparatus 374 meets the altitude threshold (e.g., in response to receiving the retransmission request 394). In this manner, the apparatus 374 may account for a possible change in the altitude of the apparatus 374.

The apparatus 374 (e.g., a UAV) may retransmit the message using omnidirectional transmissions 398*a* when the altitude of the apparatus 374 fails to meet the altitude threshold (e.g., the altitude of the apparatus 374 is less than the altitude threshold). The apparatus 374 may send the message using beamformed transmissions 398*b* when the altitude of the apparatus 374 meets the altitude threshold (e.g., the altitude of the apparatus 374 is greater than or equal to the threshold).

Figure 4A:
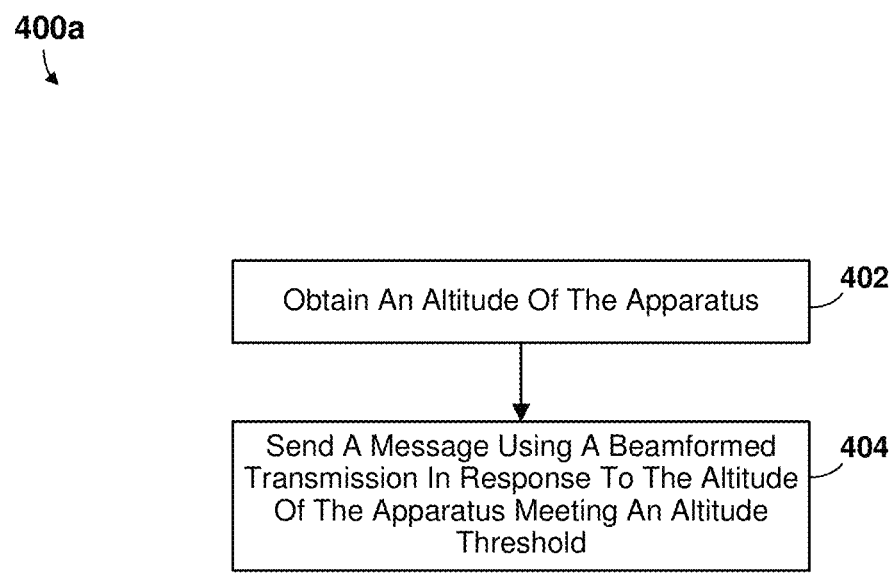
FIG. 4A is a process flow diagram illustrating a method that may be performed by a processor of an apparatus for managing a broadcast signal according to various implementations and aspects.

FIG. 4A is a process flow diagram illustrating a method 400*a* that may be performed by a processor of an apparatus (e.g., a UAV) for managing a broadcast signal according to various implementations and aspects. With reference to FIGS. 1-4B, the operations of the method 400*b* may be performed by a processor (such as the processor 210, 212, 214, 216, 218, 252, 260, 274*a*) of an apparatus (such as the apparatus 100*c*, 140, 142, 144, e.g., a UAV).

In block 402, the processor may obtain an altitude of the apparatus. In some implementations and aspects, the processor may obtain the altitude of the apparatus from one or more of an altitude sensor, barometer information (which may, for example, enable the processor to infer the altitude of the apparatus), a global navigation satellite system receiver, or a network element that provides the altitude of the apparatus (e.g., via the base station 126). Means for performing operations of block 404 may include the processor 210, 212, 214, 216, 218, 252, 260 and 274*a*, the wireless transceiver 266, the radio module 172*d*, sensors 280, the avionics module 274*e*, the wireless communication manager 101, 306, 314, and the altitude obtaining component 318.

In block 404, the processor may send a message using beamformed transmissions in response to the altitude of the apparatus meeting an altitude threshold. In some implementations and aspects, the processor may send the message using beamformed transmissions in response to determining that the message is for reception by a ground receiver and the altitude meets the altitude threshold. In some implementations and aspects, the processor may send the beamformed transmission in directional beams aimed in at least two different directions (e.g., the directional beams 130*a*-130*d*). In some implementations and aspects, the processor may send the directional beams aimed in at least two different directions within a latency constraint of the message. In some implementations and aspects, the processor may send the directional beams aimed in at least two different directions via a sidelink communication link. In some implementations and aspects, the processor may include in the beamforming transmission a beam identifier configured to enable a receiver device (e.g., the apparatus 112, 114, such as a ground receiver) to obtain the beam identifier of the directional beam (e.g., 130*a*-130*d*) used to transmit beamformed transmissions. Means for performing the operations of block 404 include the processor 210, 212, 214, 216, 218, 252, 260 and 274*a*, the wireless transceiver 266, the radio module 172*d*, the wireless communication manager 101, 306, 314, and the beamformed transmission component 320.

Figure 4B:
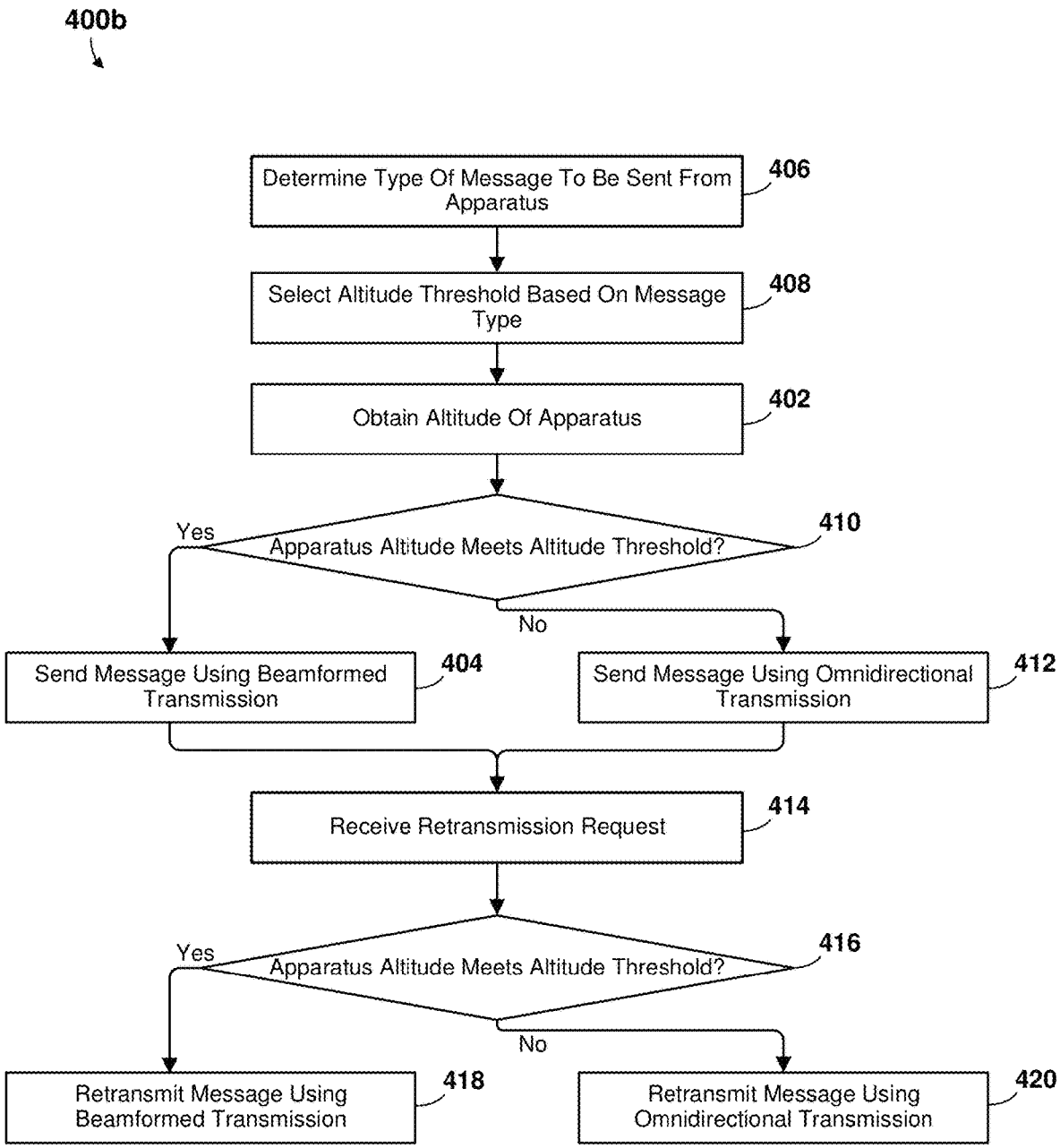
FIG. 4B is a process flow diagram illustrating a method that may be performed by a processor of an apparatus for managing a broadcast signal according to various implementations and aspects.

FIG. 4B is a process flow diagram illustrating a method 400*b* that may be performed by a processor of an apparatus (e.g., a UAV) for managing a broadcast signal according to various implementations and aspects. With reference to FIGS. 1-4B, the operations of the method 400*b* may be performed by a processor (such as the processor 210, 212, 214, 216, 218, 252, 260, 274*a*) of an apparatus (such as the apparatus 100*c*, 140, 142, 144, e.g., a UAV).

In block 406, the processor may determine a type of message to be sent from the apparatus. In some implementations and aspects, the processor may determine whether the message type is a message for reception by other apparatuses or a message for reception by a ground receiver. In some implementations and aspects, the message for reception by other apparatuses may be a maneuvering safety message and the message for reception by a ground receiver may be an identification message. Means for performing the operations of block 406 include the processor 210, 212, 214, 216, 218, 252, 260 and 274*a*, the wireless communication manager 101, 306, 314, and the message type component 324.

In block 408, the processor may select the altitude threshold based on the determined type of the message. For example, the processor may select the altitude threshold based on whether the message is of a type for reception by a ground receiver, or the message is of a type for reception by other apparatuses. In some implementations and aspects, the processor may select the altitude threshold based on one or more additional factors. For example, the processor may select the altitude threshold based on one or more of a transmit power capability of a transmit chain or a radio module (e.g., 172*d*) of the apparatus, a stored power level in a battery or power module of the apparatus (e.g., 276), beamforming capabilities of a transmission device of the apparatus (e.g., 172*d*, 172*f*), a level or an amount of radio frequency interference proximate to the apparatus, and a level or an amount of communication link congestion or network congestion Means for performing the operations of block 408 include the processor 210, 212, 214, 216, 218, 252, 260 and 274*a*, the wireless transceiver 266, the radio module 172*d*, the antenna 172*f*, the power module 276, the wireless communication manager 101, 306, 314, and the altitude threshold component 326.

In block 402, the processor may obtain the altitude of the apparatus as described.

In determination block 410, the processor may determine whether the altitude of the apparatus meets the altitude threshold. Means for performing the operations of determination block 410 include the processor 210, 212, 214, 216, 218, 252, 260 and 274*a*, the wireless communication manager 101, 306, 314, and the altitude threshold component 326.

In response to determining that the apparatus altitude meets the altitude threshold (i.e., determination block 410="Yes"), the processor may send the message using beamformed transmissions in block 404 as described.

In response to determining that the apparatus altitude fails to meet (does not meet) the altitude threshold (i.e., determination block 408="No"), the processor may send the message using omnidirectional transmissions in block 412. Means for performing the operations of block 412 include the processor 210, 212, 214, 216, 218, 252, 260, and 274*a*, the wireless transceiver 266, the wireless communication manager 101, 306, 314, and the omnidirectional transmission component 322.

In block 414, the processor may receive from a second apparatus (e.g., a receiving device) a retransmission request (e.g., a non-acknowledgment (NACK) message). In some implementations and aspects, the retransmission request may include the beam identifier of the received beamformed transmission. Means for performing the operations of block 414 include the processor 210, 212, 214, 216, 218, 252, 260, 274a, the radio module 172d, the wireless communication manager 101, 306, 314, and the retransmission component 330.

In determination block 416, the processor may determine whether the altitude of the apparatus meets the altitude threshold. Means for performing the operations of determination block 416 include the processor 210, 212, 214, 216, 218, 252, 260 and 274a, the wireless communication manager 101, 306, 314, and the altitude threshold component 326.

In response to determining that the apparatus altitude meets the altitude threshold (i.e., determination block 416="Yes"), the processor may transmit the message using beamformed transmissions in block 418. In some implementations and aspects, to retransmit the message the processor may perform one or more operations similar to those described above with respect to block 410. Means for performing the operations of block 418 include the processor 210, 212, 214, 216, 218, 252, 260 and 274a, the wireless transceiver 266, the radio module 172d, the wireless communication manager 101, 306, 314, and the beamformed transmission component 320.

In response to determining that the apparatus altitude does not meet the altitude threshold (i.e., determination block 416="No"), the processor may retransmit the message using omnidirectional transmissions in block 420. In some implementations and aspects, to retransmit the message the processor may perform one or more operations similar to those described above with respect to block 412. Means for performing the operations of block 420 include the processor 210, 212, 214, 216, 218, 252, 260 and 274a, the wireless transceiver 266, the radio module 172d, the wireless communication manager 101, 306, 314, and the omnidirectional transmission component 320.

Figure 5:
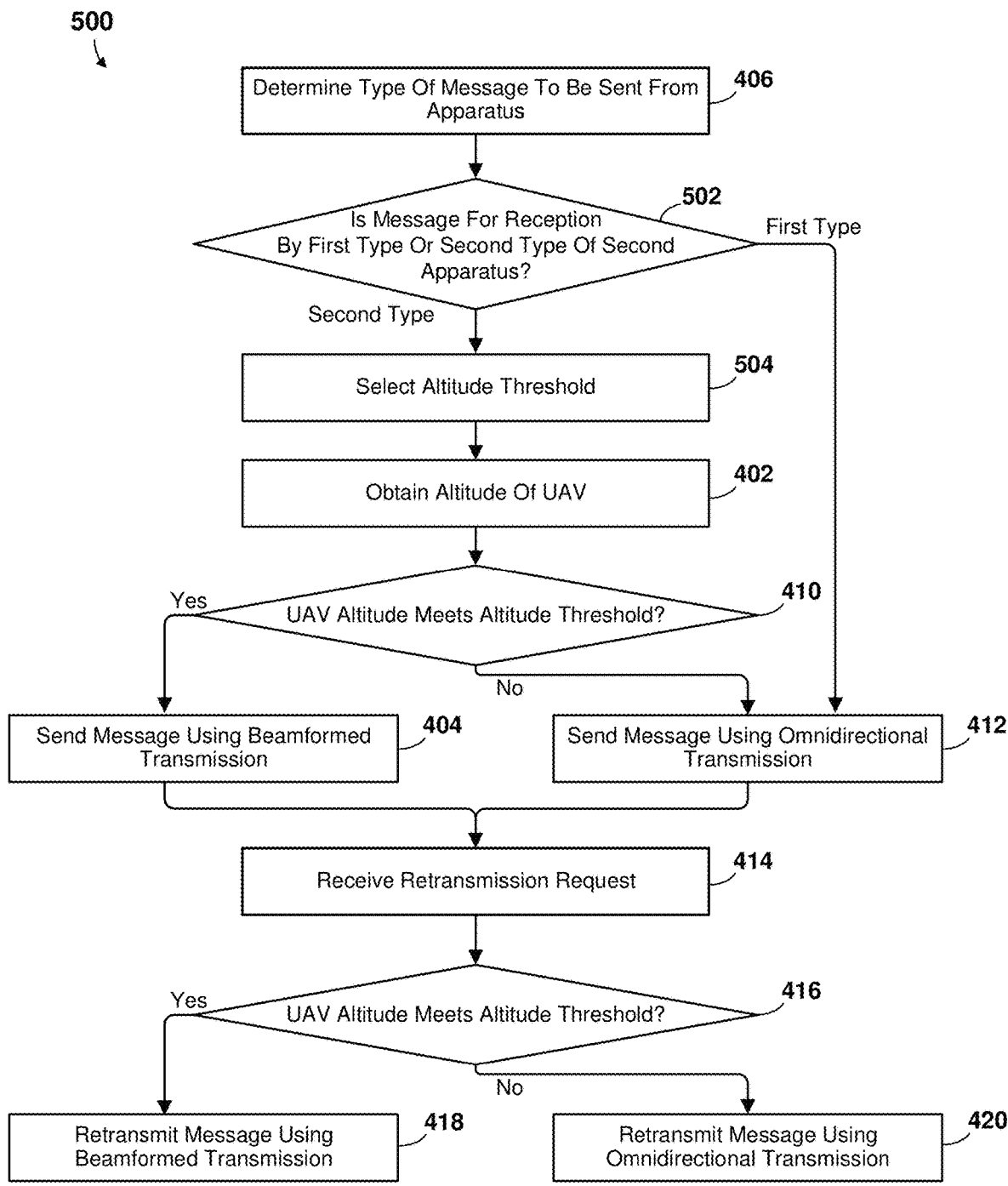
FIG. 5 is a process flow diagram illustrating operations that may be performed by a processor of an apparatus as part of the methods for managing a broadcast signal according to various implementations and aspects.

FIG. 5 is a process flow diagram illustrating operations 500 that may be performed by a processor of an apparatus (e.g., a UAV) as part of the methods 400a and 400b for managing a broadcast signal according to various implementations and aspects. With reference to FIGS. 1-5, the operations 500 may be performed by a processor (such as the processor 210, 212, 214, 216, 218, 252, 260, 274a) of an apparatus (such as the apparatus 100c, 140, 142, 144, e.g., a UAV).

In block 406, the processor may determine a type of a message to be sent from the apparatus as described.

In determination block 502, the processor may determine whether the message is intended for reception by a first type of second apparatus (e.g., UAV 142, 144) or a second type of second apparatus (e.g., ground receiver 112, 114). Means for performing the operations of determination block 502 include the processor 210, 212, 214, 216, 218, 252, 260 and 274a, the wireless communication manager 101, 306, 314, and the apparatus type component 328.

In response to determining that the message is intended for the first type of second apparatus (i.e., determination block 502="First Type") (e.g., UAV 142, 144), the processor may send the message using omnidirectional transmissions in block 412 as described.

In response to determining that the message is intended for the first type of second apparatus (i.e., determination block 502="Second Type") (e.g., ground receiver 112, 114), the processor may select an altitude threshold in block 504.

In some implementations and aspects, the processor may obtain the altitude of the apparatus from one or more of an altitude sensor, a barometer information (which may, for example, enable the processor to infer the altitude of the apparatus), a global navigation satellite system receiver, or a network element that provides the altitude of the apparatus (e.g., via the base station 126). Means for performing the operations of block 504 include the processor 210, 212, 214, 216, 218, 252, 260, and 274a, the wireless transceiver 266, the radio module 172d, sensors 280, the avionics module 274e, the wireless communication manager 101, 306, 314, and the altitude threshold component 326.

In blocks 402, 404, and 410-420, the processor may perform the operations of corresponding blocks of the methods 400a and 400b as described.

Figure 6:
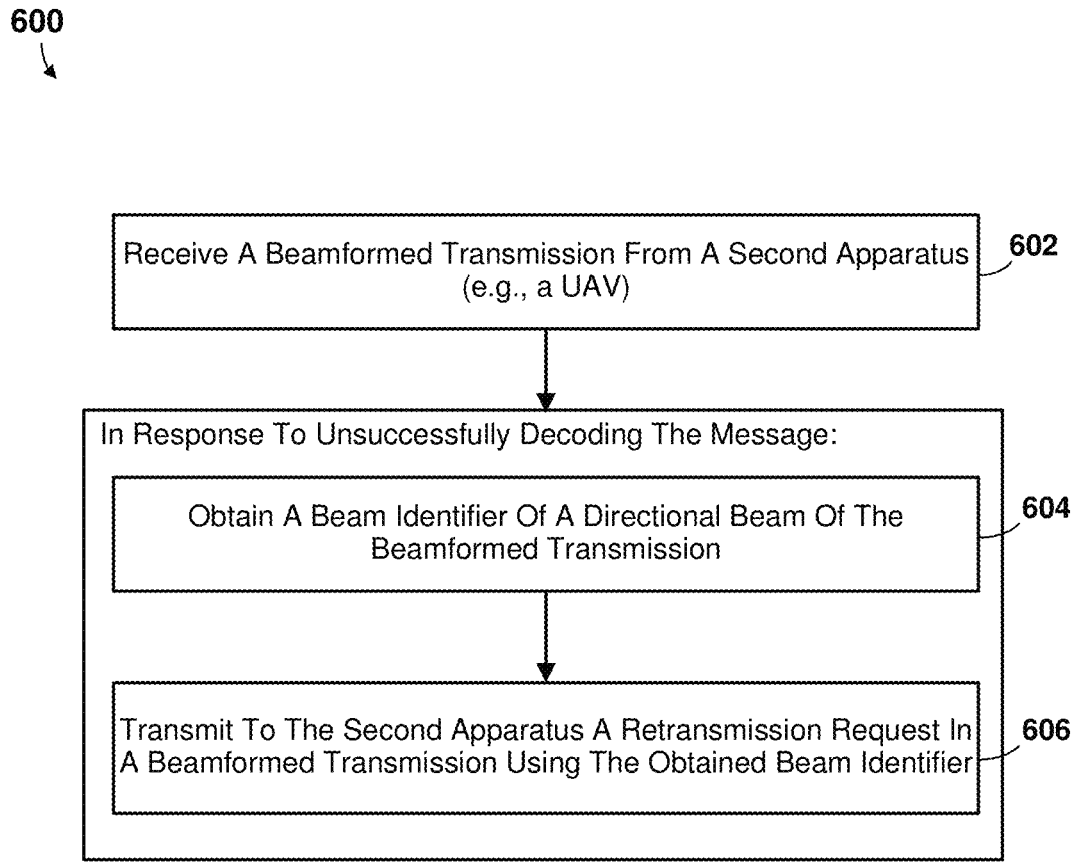
FIG. 6 is a process flow diagram illustrating a method that may be performed by a processor of an apparatus for managing a broadcast signal of a second apparatus according to various implementations and aspects.

FIG. 6 is a process flow diagram illustrating a method 600 that may be performed by a processor of an apparatus (e.g., a ground receiver) for managing a broadcast signal of a second apparatus (e.g., a UAV) according to various implementations and aspects. With reference to FIGS. 1-6, operations of the method 600 may be performed by a processor (such as the processor 210, 212, 214, 216, 218, 252, 260) of a an apparatus (e.g., ground receiver 112, 114).

In block 602, the processor may receive beamformed transmissions from a second apparatus (e.g., UAV 140, 142, 144). Means for performing the operations of block 602 include the processor 210, 212, 214, 216, 218, 252, 260, the wireless transceiver 266, the wireless communication manager 354, 364, and the beamformed transmission component 366.

In response to unsuccessfully decoding the message, the processor may obtain a beam identifier of a directional beam of beamformed transmissions in block 604. Means for performing the operations of block 604 include the processor 210, 212, 214, 216, 218, 252, 260, the wireless communication manager 354, 364, and the beam identifier component 368.

In block 606, the processor may transmit to the second apparatus a retransmission request in beamformed transmissions using the obtained beam identifier. Means for performing the operations of block 606 include the processor 210, 212, 214, 216, 218, 252, 260, the wireless transceiver 266, the wireless communication manager 354, 364, and the retransmission component 370.

Figure 7:
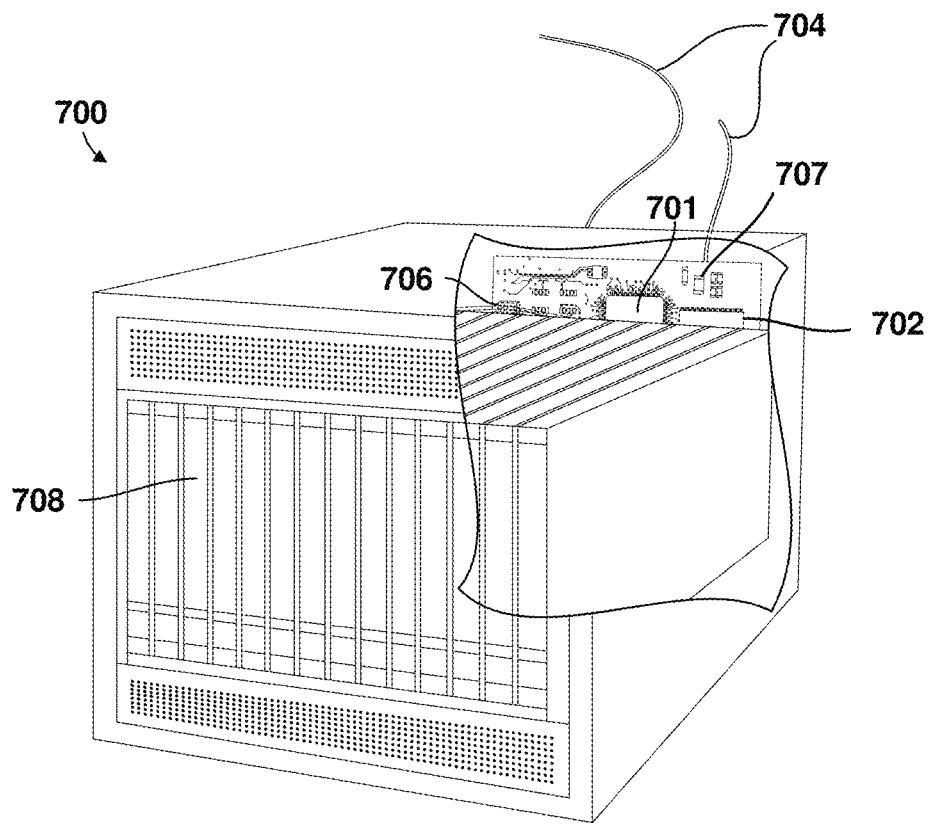
FIG. 7 is a component block diagram of a network computing device suitable for use with various implementations and aspects.

FIG. 7 is a component block diagram of a network computing device 700 suitable for use with various implementations and aspects. Such network computing devices may include at least the components illustrated in FIG. 7. With reference to FIGS. 1-7, the network computing device 700 may typically include a processor 701 coupled to volatile memory 702 and a large capacity nonvolatile memory, such as a disk drive 708. The network computing device 700 also may include a peripheral memory access device 706 such as a floppy disc drive, compact disc (CD) or digital video disc (DVD) drive coupled to the processor 701. The network computing device 700 also may include network access ports 704 (or interfaces) coupled to the processor 701 for establishing data connections with a network, such as the Internet or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

The processor of the network computing device 700 may be any programmable microprocessor, microcomputer or multiple processor chip or chips that can be configured by software instructions (applications) to perform a variety of functions, including the functions of some implementations and aspects described below. In some wireless devices, multiple processors may be provided, such as one processor within an SOC (e.g., 204) dedicated to wireless communication functions and one processor within an SOC (e.g., 202) dedicated to running other applications. Software applications may be stored in the memory 702 before they are accessed and loaded into the processor. The processors may include internal memory sufficient to store the application software instructions.

Figure 8:
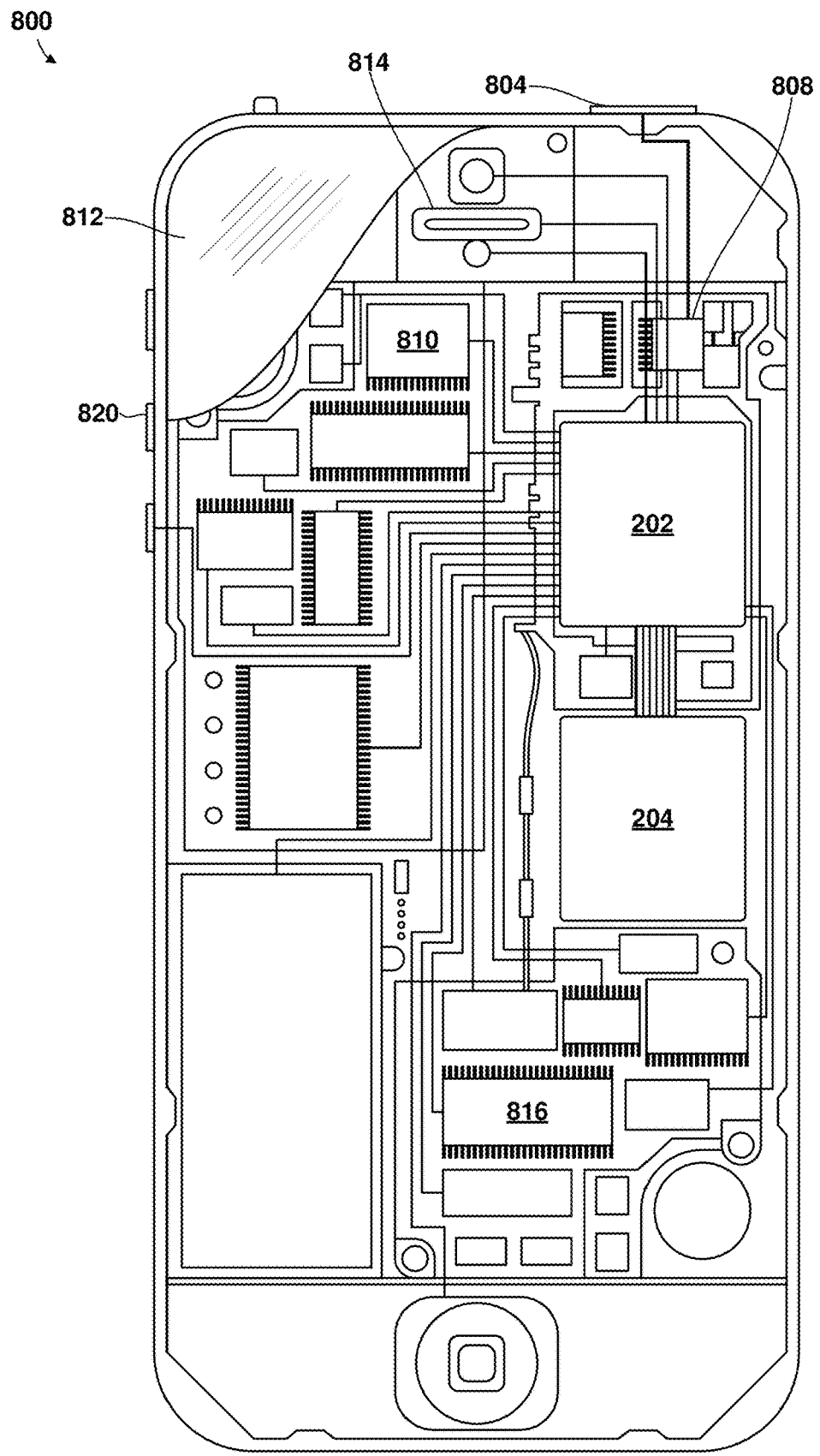
FIG. 8 is a component block diagram illustrating an example apparatus suitable for use with various implementations and aspects.

FIG. 8 is a component block diagram illustrating an example wireless device 800 suitable for use with various implementations and aspects. With reference to FIGS. 1-8, the wireless device 800 (such as the receiver devices 112, 114) may be a device suitable for use in various implementations and aspects, such as a mobile device. The wireless device 800 may include a first SOC 202 (such as a SOC-CPU) coupled to a second SOC 204 (such as a 5G capable SOC). The first and second SOCs 202, 204 may be coupled to internal memory 816, a display 812, and to a speaker 814. Additionally, the wireless device 800 may include an antenna 804 for sending and receiving electromagnetic radiation that may be connected to a wireless data link or cellular telephone transceiver 808 coupled to one or more processing systems in the first or second SOCs 202, 204. The wireless device 800 may include menu selection buttons or rocker switches 820 for receiving user inputs.

The wireless device 800 also may include a sound encoding/decoding (CODEC) circuit 810, which digitizes sound received from a microphone into data packets suitable for wireless transmission and decodes received sound data packets to generate analog signals that are provided to the speaker 814 to generate sound. One or more of the processing systems in the first and second SOCs 202, 204, wireless transceiver 808 and CODEC 810 may include a digital signal processor (DSP) circuit (not shown separately).

The processing systems of the network computing device 800 and the wireless device 800 may be any programmable microprocessor, microcomputer or multiple processor chip or chips that can be configured by processor-executable instructions to perform a variety of functions, including the functions of the various implementations and aspects described herein. In some mobile devices, multiple processing systems may be provided, such as one processing system within an SOC 204 dedicated to wireless communication functions and one processing system within an SOC 202 dedicated to running other applications. Software applications may be stored in the memory 816 before they are accessed and loaded into the processing system. The processing systems may include internal memory sufficient to store the application software instructions.

Implementation examples are described in the following paragraphs. While some of the following implementation examples are described in terms of example methods, further example implementations and aspects may include: the example methods discussed in the following paragraphs implemented by an apparatus including a processor configured with processor-executable instructions to perform operations of the methods of the following implementation examples; the example methods discussed in the following paragraphs implemented by an apparatus including means for performing functions of the example methods; and the example methods discussed in the following paragraphs implemented as a non-transitory processor-readable storage medium having stored thereon processor-executable instructions configured to cause a processor of an apparatus to perform the operations of the example methods.

Example 1. A method performed by an apparatus for managing a broadcast signal, including obtaining an altitude of the apparatus, and sending a message using beamformed transmissions in response to the altitude of the apparatus meeting an altitude threshold.

Example 2. The method of example 1, further including sending the message using omnidirectional transmissions in response to the altitude of the apparatus failing to meet the altitude threshold.

Example 3. The method of either of examples 1 or 2, in which obtaining an altitude of the apparatus includes obtaining the altitude of the apparatus from one or more of an altitude sensor, apparatus barometer information, a global navigation satellite system receiver, or a network element that provides the altitude of the apparatus.

Example 4. The method of any of examples 1-3, further including determining a type of the message, and selecting the altitude threshold based on the determined type of the message.

Example 5. The method of any of examples 1-4, further including sending the message using omnidirectional transmissions in response to the message being for reception by a first type of second apparatus, and sending the message using beamformed transmissions in response to the message being for reception by the second type of second apparatus.

Example 6. The method of example 5, in which sending the message using beamformed transmissions in response to the message being for reception by the second type of second apparatus includes sending the message using beamformed transmissions in response to the message being for reception by the second type of second apparatus and the altitude meeting the altitude threshold.

Example 7. The method of example 5, in which the message for reception by the first type of second apparatus includes a maneuvering safety message and the message for reception by the second type of second apparatus includes an identification message.

Example 8. The method of any of examples 1-7, further including sending the message using beamformed transmissions in directional beams in at least two different directions.

Example 9. The method of any of examples 1-8, further including sending the message using beamformed transmissions in directional beams in at least two different directions within a latency constraint of the message.

Example 10. The method of any of examples 1-9, further including sending the message using beamformed transmissions in directional beams in at least two different directions via a sidelink communication link.

Example 11. The method of any of examples 1-10, further including in beamformed transmissions a beam identifier that enables a receiver device to obtain the beam identifier of a directional beam used to transmit a received beamformed transmission.

Example 12. The method of example 9, further including receiving from a second apparatus a retransmission request including the beam identifier of the received beamformed transmission, and retransmitting the message using beamformed transmissions associated with the beam identifier.

Example 13. The method of example 12, further including receiving from a second apparatus a retransmission request, and retransmitting the message using omnidirectional transmissions when the altitude of the apparatus fails to meet the altitude threshold.

Example 14. The method of example 13, further including retransmitting the message using beamformed transmissions when the altitude of the apparatus meets the altitude threshold.

Example 15. An apparatus including means for performing operations of the methods of any of examples 1-14.

Example 16. An apparatus including a memory; and at least one processor coupled to the memory, the memory and the at least one processor to perform operations of the methods of any of examples 1-14.

Example 17. A non-transitory processor readable storage medium having processor-executable instructions stored thereon configured to cause a processor of an apparatus to perform operations of the methods of any of examples 1-14.

Example 18. A method performed by an apparatus for managing a broadcast signal of a second apparatus, including receiving in beamformed transmissions from the second apparatus, obtaining a beam identifier of a directional beam of beamformed transmissions in response to unsuccessfully decoding the message, and transmitting to the second apparatus a retransmission request in beamformed transmissions using the obtained beam identifier.

Example 19. An apparatus comprising means for performing operations of the method of example 18.

Example 20. An apparatus comprising a memory; and at least one processor coupled to the memory, the memory and the at least one processor to perform operations of the method of example 18.

Example 21. A non-transitory processor readable storage medium having processor-executable instructions stored thereon configured to cause a processor of an apparatus to perform operations of the method of example 18.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations and aspects. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various implementations and aspects illustrated and described are provided merely as examples to illustrate various features of the claims. However, features shown and described with respect to any given implementation are not necessarily limited to the associated implementation and may be used or combined with other implementations and aspects that are shown and described. Further, the claims are not intended to be limited by any one example implementation. For example, one or more of the methods and operations 400*a*, 400*b*, 500, and 600 may be substituted for or combined with one or more operations of the methods and operations 400*a*, 400*b*, 500, and 600.

The foregoing method descriptions and the process flow diagrams are provided merely as illustrative examples and are not intended to require or imply that the operations of various implementations and aspects must be performed in the order presented. As will be appreciated by one of skill in the art the order of operations in the foregoing implementations and aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the implementations and aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement various illustrative logics, logical blocks, modules, and circuits described in connection with the implementations and aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more implementations and aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed implementations and aspects is provided to enable any person skilled in the art to make or use the claims. Various modifications to these implementations and aspects will be readily apparent to those skilled in the art, and the generic principles defined herein may be applied to other implementations and aspects without departing from the scope of the claims. Thus, the present disclosure is not intended to be limited to the implementations and aspects shown herein but is to be accorded the widest scope consistent with the following claims and the principles and novel features disclosed herein.

What is claimed is:

1. An apparatus for wireless communication, comprising:
   memory; and
   one or more processors coupled to the memory, the one or more processors configured to:
     obtain an altitude of the apparatus;
     determine an altitude threshold based on a type of a message; and
     send the message using beamformed transmissions in response to the altitude of the apparatus meeting the altitude threshold based on the type of the message.

2. The apparatus of claim 1, wherein the one or more processors are further configured to send the message using omnidirectional transmissions in response to the altitude of the apparatus failing to meet the altitude threshold.

3. The apparatus of claim 1, wherein the one or more processors are further configured to obtain the altitude of the apparatus from one or more of an altitude sensor, apparatus barometer information, a global navigation satellite system receiver, or a network element that provides the altitude of the apparatus.

4. The apparatus of claim 1, wherein to determine the altitude threshold based on the type of the message, the one or more processors are configured to:
   determine the type of the message; and
   select the altitude threshold based on the type of the message.

5. The apparatus of claim 1, wherein the one or more processors are further configured to:
   send the message using omnidirectional transmissions in response to the message being for reception by a first type of second apparatus; and
   send the message using beamformed transmissions in response to the message being for reception by a second type of second apparatus.

6. The apparatus of claim 5, wherein the one or more processors are further configured to send the message using beamformed transmissions in response to the message being for reception by the second type of second apparatus and the altitude meeting the altitude threshold.

7. The apparatus of claim 5, wherein the one or more processors are further configured such that the message for reception by a first type of second apparatus comprises a maneuvering safety message and the message for reception by a second type of second apparatus comprises an identification message.

8. The apparatus of claim 1, wherein the one or more processors are further configured to send the message using beamformed transmissions in directional beams in at least two different directions.

9. The apparatus of claim 1, wherein the one or more processors are further configured to send the message using beamformed transmissions in directional beams in at least two different directions within a latency constraint of the message.

10. The apparatus of claim 1, wherein the one or more processors are further configured to send the message using beamformed transmissions in directional beams in at least two different directions via a sidelink communication link.

11. The apparatus of claim 1, wherein the one or more processors are further configured to include in beamformed transmissions a beam identifier that enables a receiver device to obtain the beam identifier of a directional beam used to transmit a received beamformed transmission.

12. The apparatus of claim 11, wherein the one or more processors are further configured to:
    receive from a second apparatus a retransmission request including the beam identifier of the received beamformed transmission; and
    retransmit the message using beamformed transmissions associated with the beam identifier.

13. The apparatus of claim 11, wherein the one or more processors are further configured to:
    receive from a second apparatus a retransmission request; and
    retransmit the message using omnidirectional transmissions when the altitude of the apparatus fails to meet the altitude threshold.

14. The apparatus of claim 12, wherein the one or more processors are further configured to retransmit the message using beamformed transmissions when the altitude of the apparatus meets the altitude threshold.

15. A method performed by an apparatus for managing a broadcast signal, comprising:
obtaining an altitude of the apparatus;
determining an altitude threshold based on a type of a message; and
sending the message using beamformed transmissions in response to the altitude of the apparatus meeting the altitude threshold based on the type of the message.

16. The method of claim 15, further comprising sending the message using omnidirectional transmissions in response to the altitude of the apparatus failing to meet the altitude threshold.

17. The method of claim 15, wherein obtaining the altitude of the apparatus comprises obtaining the altitude of the apparatus from one or more of an altitude sensor, apparatus barometer information, a global navigation satellite system receiver, or a network element that provides the altitude of the apparatus.

18. The method of claim 15, wherein determining the altitude threshold based on the type of the message comprises:
determining the type of the message; and
selecting the altitude threshold based on the type of the message.

19. The method of claim 15, further comprising:
sending the message using omnidirectional transmissions in response to the message being for reception by a first type of second apparatus; and
sending the message using beamformed transmissions in response to the message being for reception by a second type of second apparatus.

20. The method of claim 19, wherein sending the message using beamformed transmissions in response to the message being for reception by the second type of second apparatus comprises sending the message using beamformed transmissions in response to the message being for reception by the second type of second apparatus and the altitude meeting the altitude threshold.

21. The method of claim 19, wherein the message for reception by the first type of second apparatus comprises a maneuvering safety message and the message for reception by the second type of second apparatus comprises an identification message.

22. The method of claim 15, further comprising sending the message using beamformed transmissions in directional beams in at least two different directions.

23. The method of claim 15, further comprising sending the message using beamformed transmissions in directional beams in at least two different directions within a latency constraint of the message.

24. The method of claim 15, further comprising sending the message using beamformed transmissions in directional beams in at least two different directions via a sidelink communication link.

25. The method of claim 15, further comprising including in beamformed transmissions a beam identifier that enables a receiver device to obtain the beam identifier of a directional beam used to transmit a received beamformed transmission.

26. The method of claim 25, further comprising:
receiving from a second apparatus a retransmission request including the beam identifier of the received beamformed transmission; and
retransmitting the message using beamformed transmissions associated with the beam identifier.

27. The method of claim 25, further comprising:
receiving from a second apparatus a retransmission request; and
retransmitting the message using omnidirectional transmissions when the altitude of the apparatus fails to meet the altitude threshold.

28. The method of claim 27, further comprising retransmitting the message using beamformed transmissions when the altitude of the apparatus meets the altitude threshold.

29. A non-transitory processor-readable storage medium having processor-executable instructions stored thereon configured to cause one or more processors of an apparatus to:
Obtain an altitude of the apparatus;
determine an altitude threshold based on a type of a message; and
send the message using beamformed transmissions in response to the altitude of the apparatus meeting the altitude threshold based on the type of the message.

30. The non-transitory processor-readable storage medium of claim 29, wherein the processor-executable instructions stored thereon are further configured to cause the one or one or more processors of the apparatus to:
send the message using omnidirectional transmissions in response to the altitude of the apparatus failing to meet the altitude threshold.

31. An apparatus for wireless communication, comprising:
means for obtaining an altitude of the apparatus;
means for determining an altitude threshold based on a type of a message; and
means for sending the message using beamformed transmissions in response to the altitude of the apparatus meeting the altitude threshold based on the type of the message.

* * * * *